Oct. 9, 1951  O. MYERS  2,570,971
VERTICAL LINE NUMBER TRANSLATOR
Filed Nov. 14, 1947  25 Sheets-Sheet 11

INVENTOR
O. MYERS
BY
ATTORNEY

Oct. 9, 1951 — O. MYERS — 2,570,971
VERTICAL LINE NUMBER TRANSLATOR
Filed Nov. 14, 1947 — 25 Sheets-Sheet 12

INVENTOR
O. MYERS
BY
ATTORNEY

Oct. 9, 1951 O. MYERS 2,570,971
VERTICAL LINE NUMBER TRANSLATOR
Filed Nov. 14, 1947 25 Sheets-Sheet 25

INVENTOR
O. MYERS
BY
R. Marino
ATTORNEY

Patented Oct. 9, 1951

2,570,971

UNITED STATES PATENT OFFICE 2,570,971

VERTICAL LINE NUMBER TRANSLATOR

Oscar Myers, Mount Vernon, N. Y., assignor to Bell Telephone Laboratories, Incorporated, New York, N. Y., a corporation of New York Application November 14, 1947, Serial No. 786,074

5 Claims. (Cl. 179—18)

This invention relates to automatic call-data recording telephone systems and more particularly to means for identifying calling subscribers in such systems.

In telephone systems where records are automatically made of the details of calls for which subscribers are to charged, an identification of the calling station is an essential part of the information to be recorded in order that the subscriber to whom the call is to be charged may be determined.

The calling line may be identified by its location on the connecting switches of the central office but, for billing purposes, it is necessary to determine the directory number of the calling station to identify the subscriber to whom the call is to be charged. The present invention discloses a means whereby, the calling line having been identified by its location on the connecting switches and said identification registered, together with a station indication, the directory number of the calling station is automatically determined and the register reset in accordance with said number.

The features of the invention and its mode of operation will be apparent from the accompanying description, the appended claims, and the drawings, in which:

Figure 1:
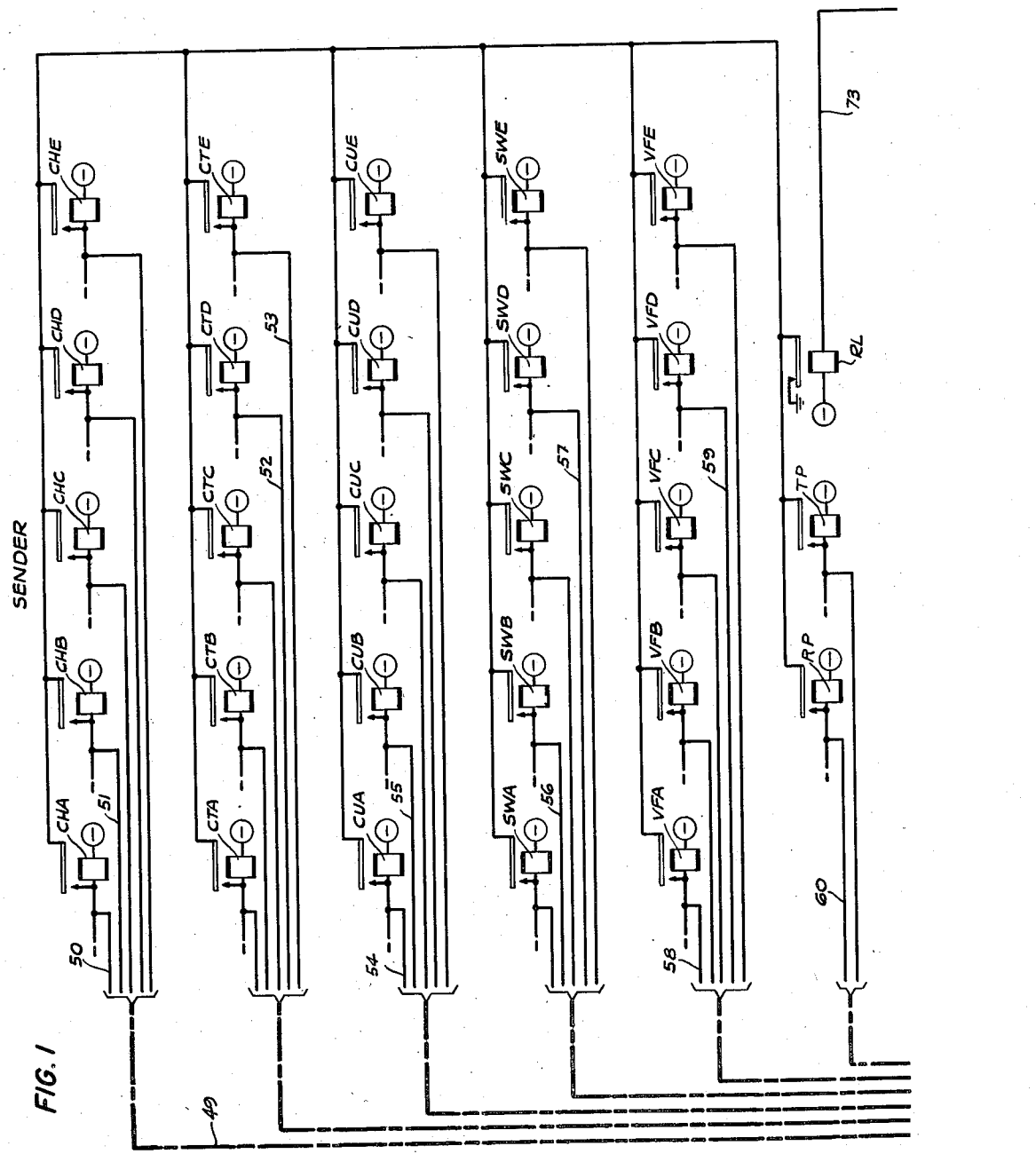
Fig. 1 shows a portion of the sender circuit.
Figure 2:
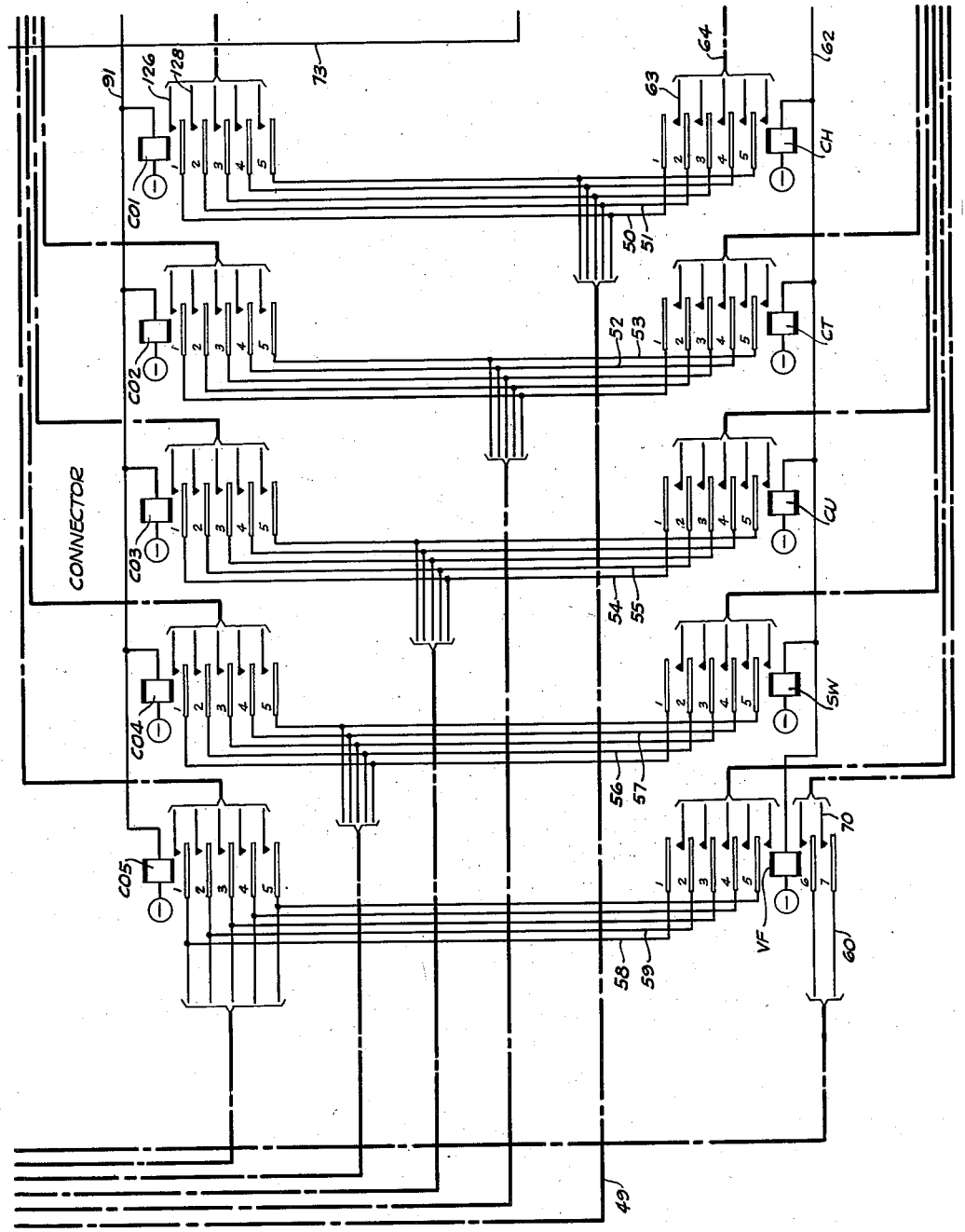
Fig. 2 shows the circuits of the connector.
Figure 3:
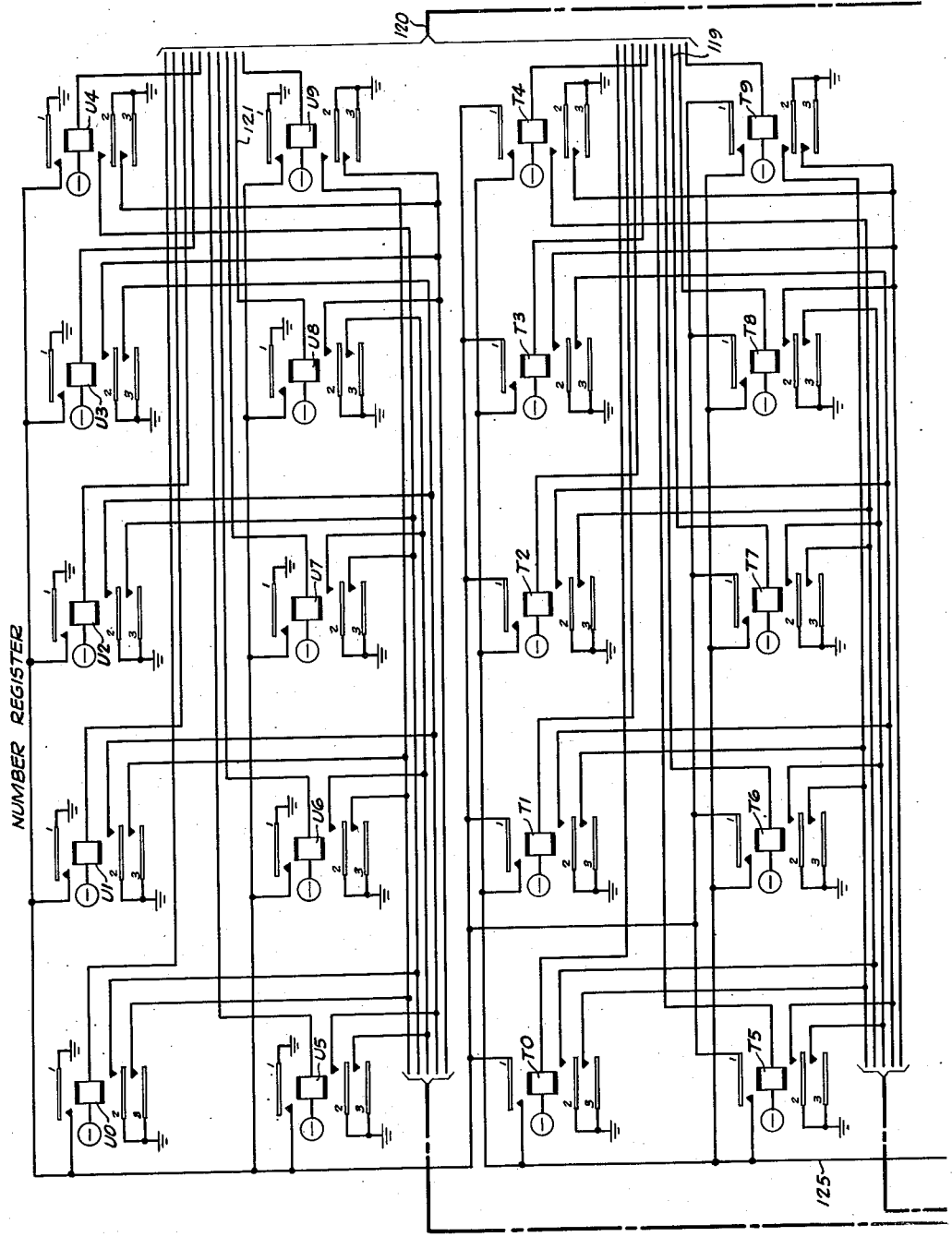
Figs. 3 to 5 show the circuits of the number register.
Figure 4:
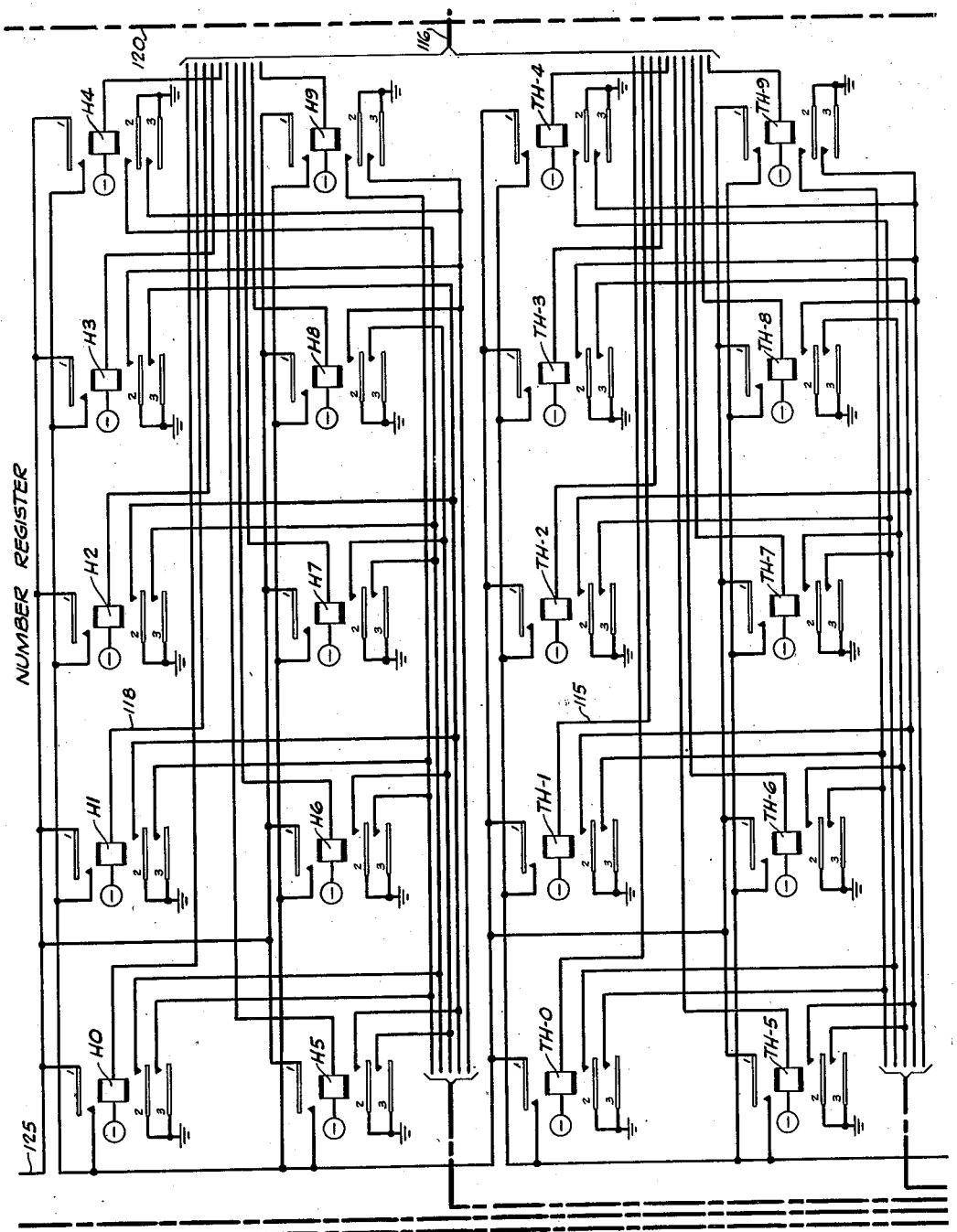
Figure 5:
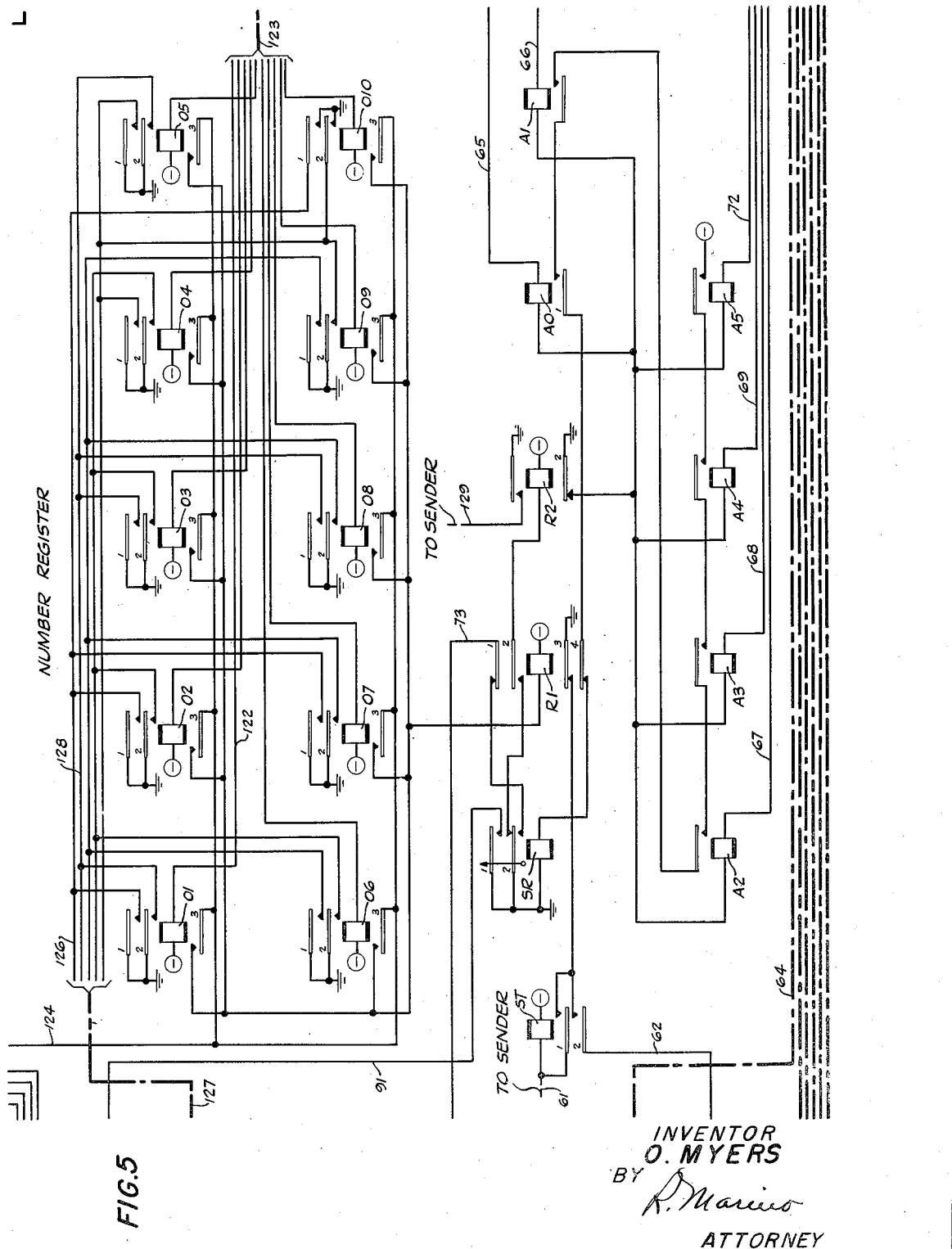
Figure 6:
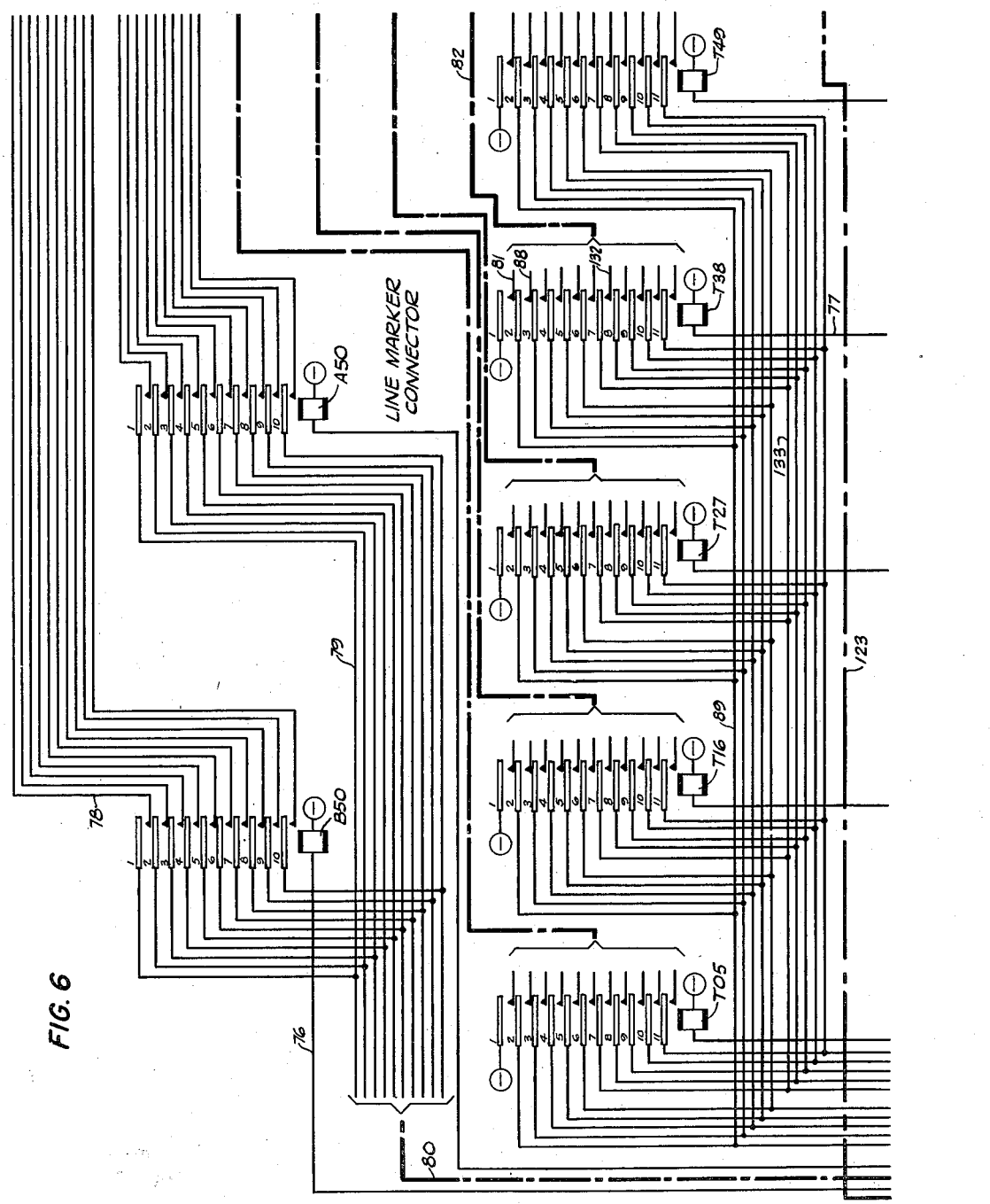
Figs. 6, 10, 11 and 15 show the circuits of the line marker connector.
Figure 7:
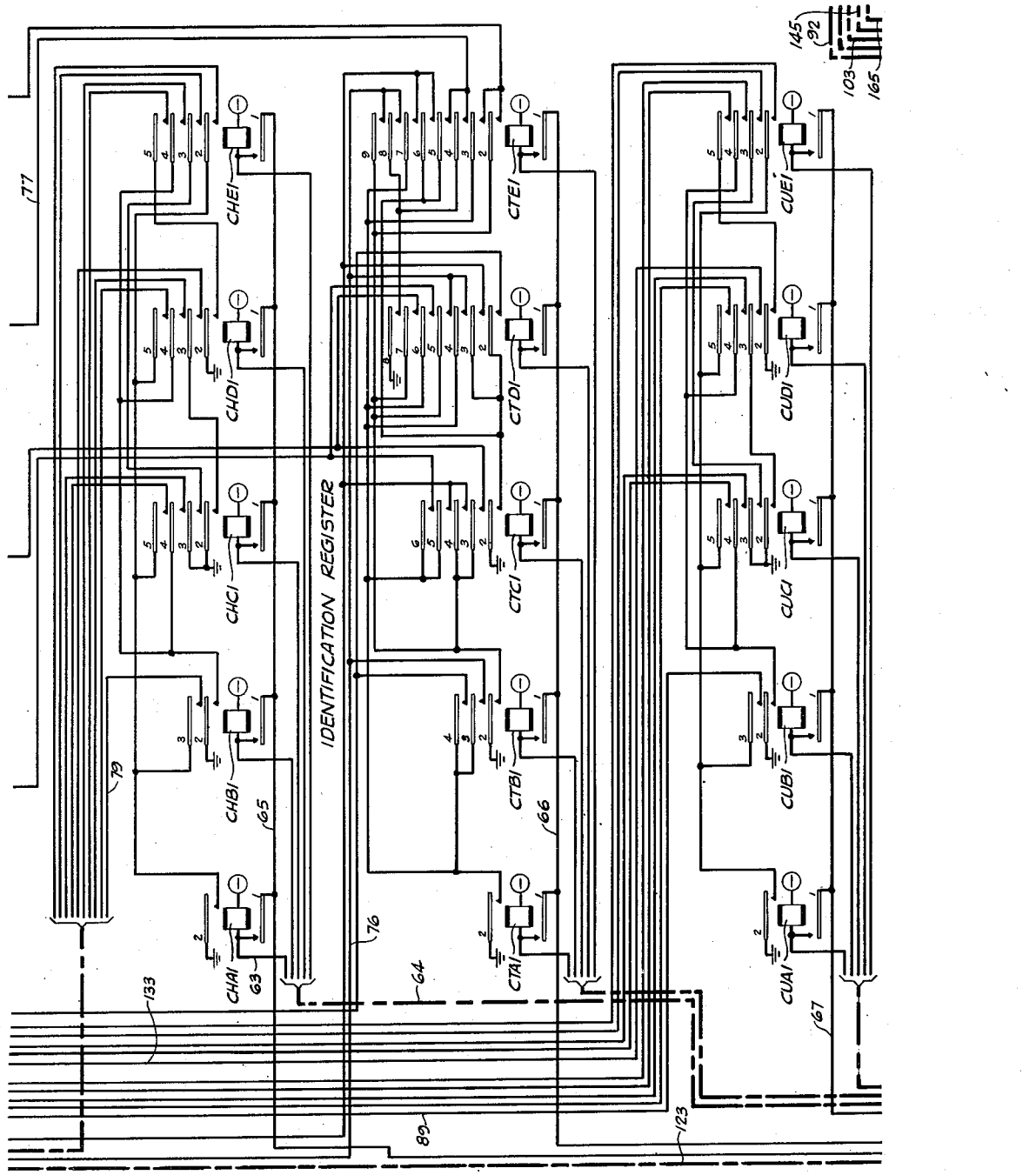
Figs. 7 to 9 show the circuits of the identification register.
Figure 8:
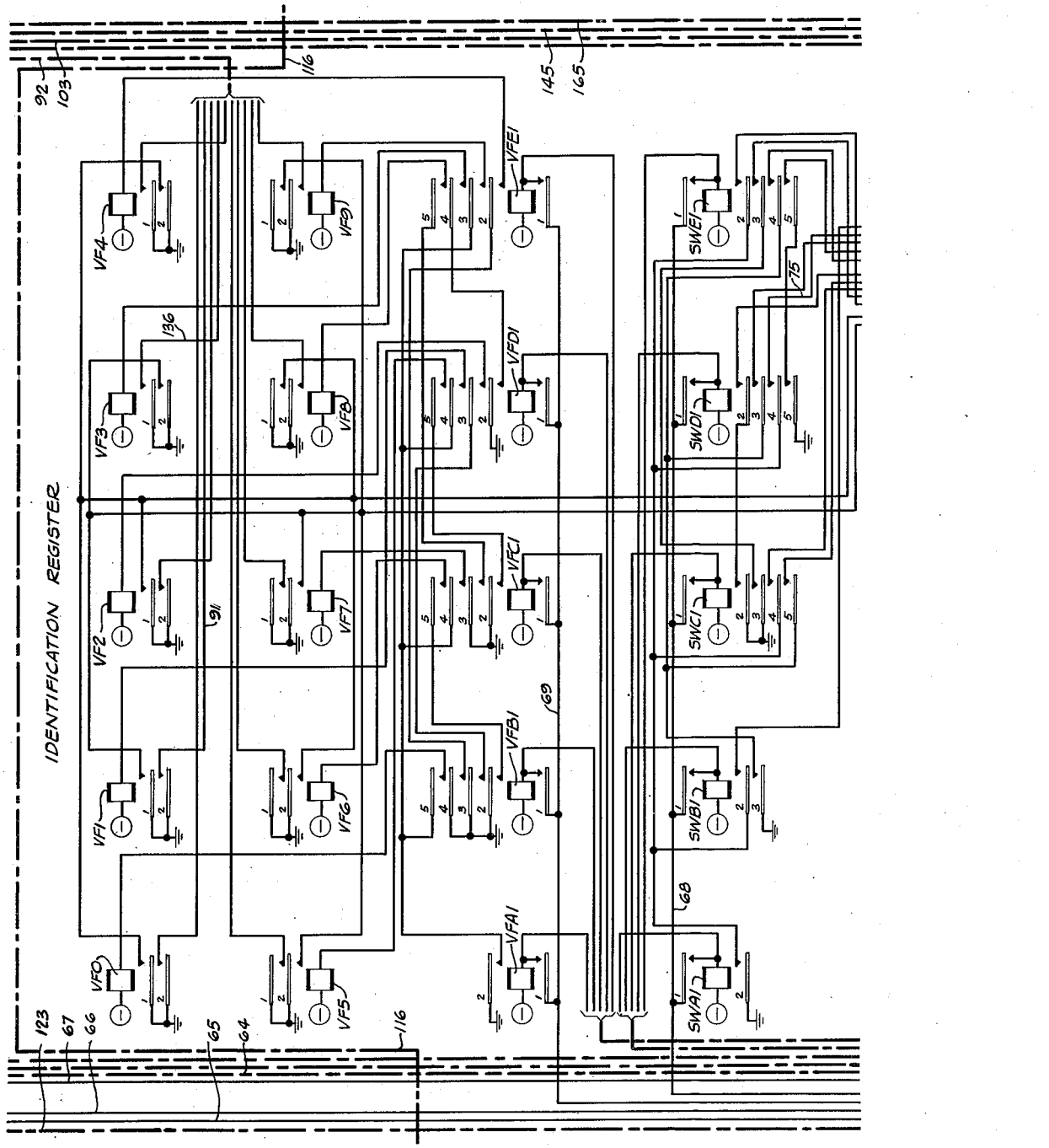
Figure 9:
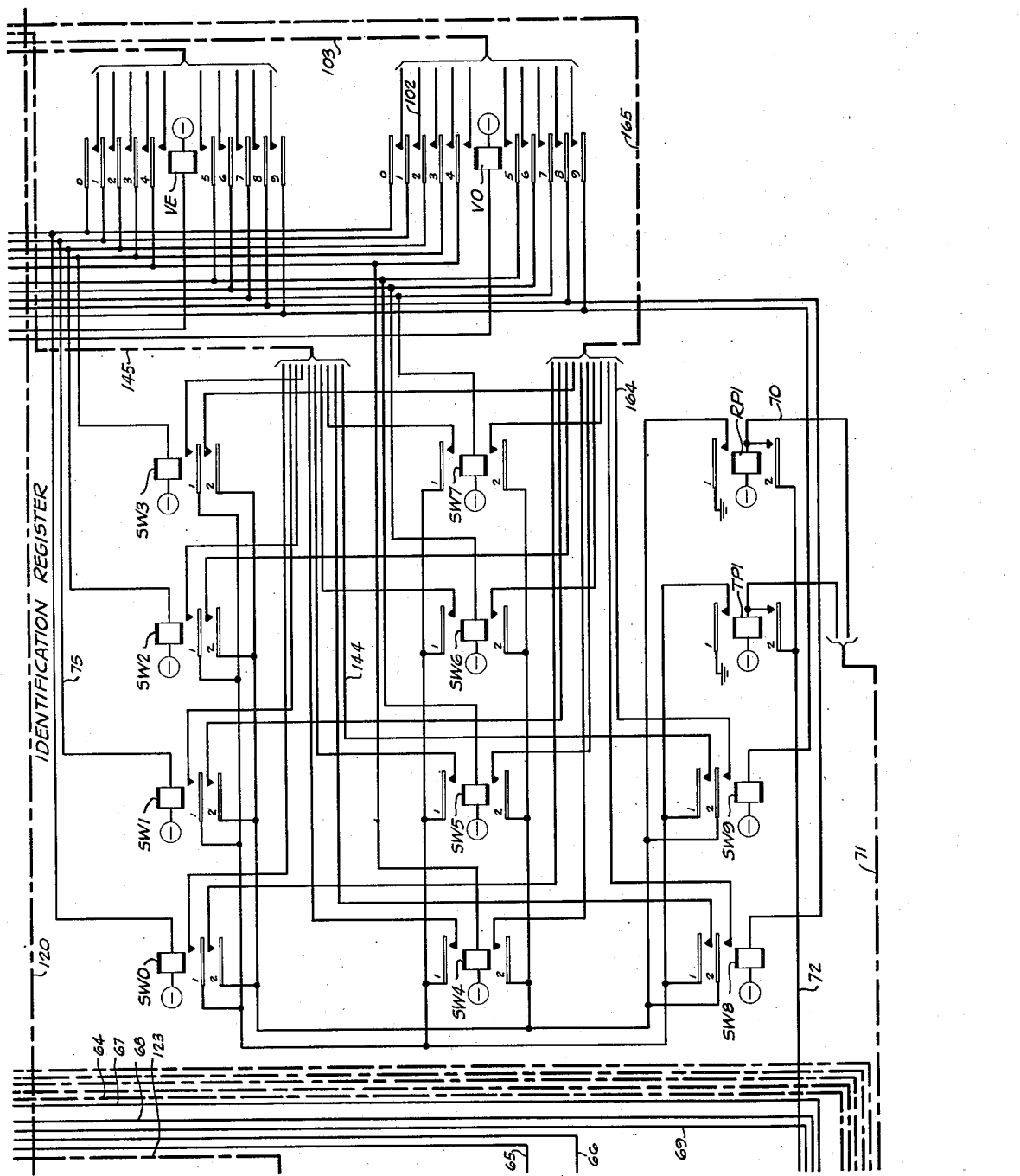
Figure 10:
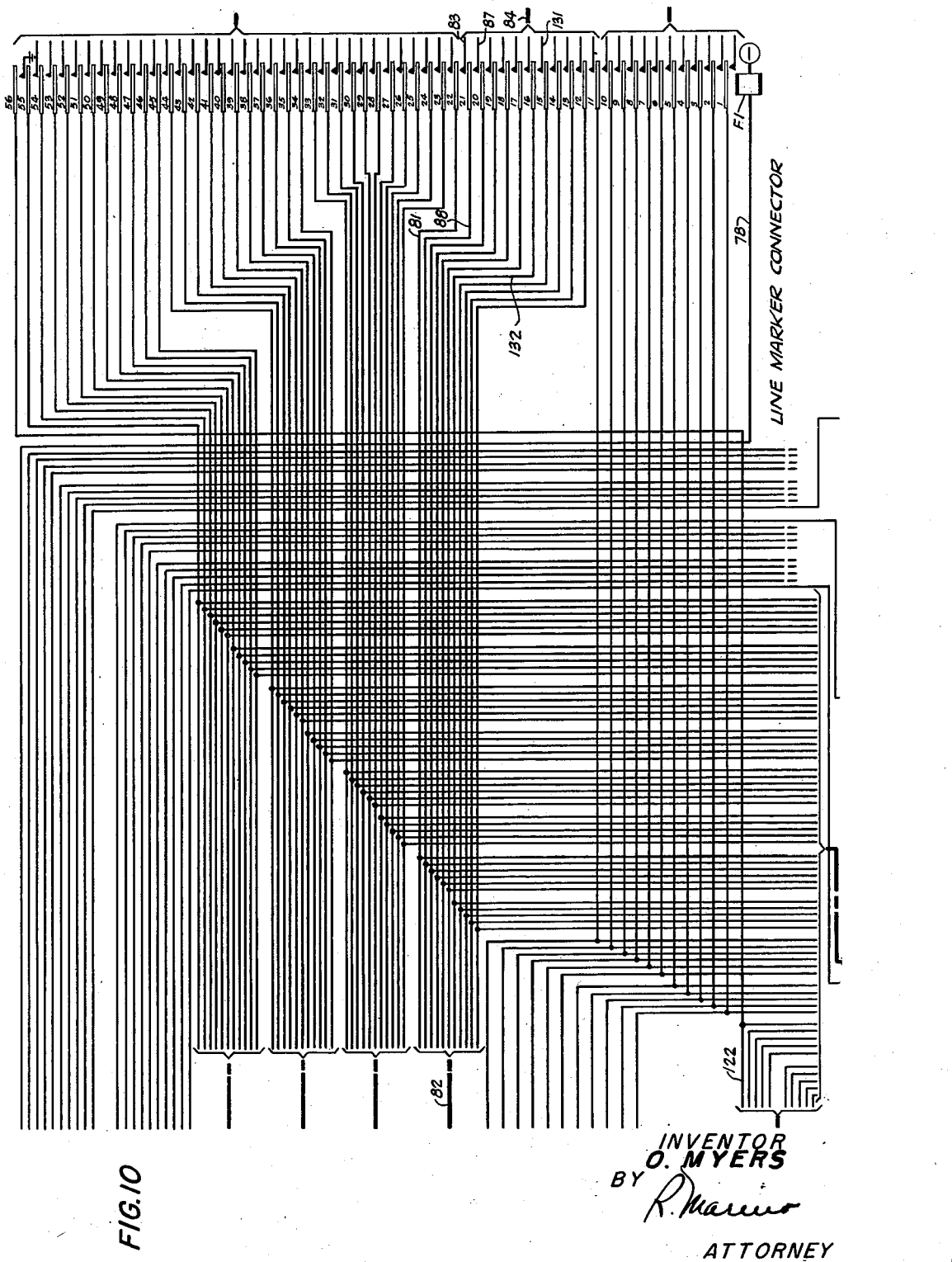
Figure 11:
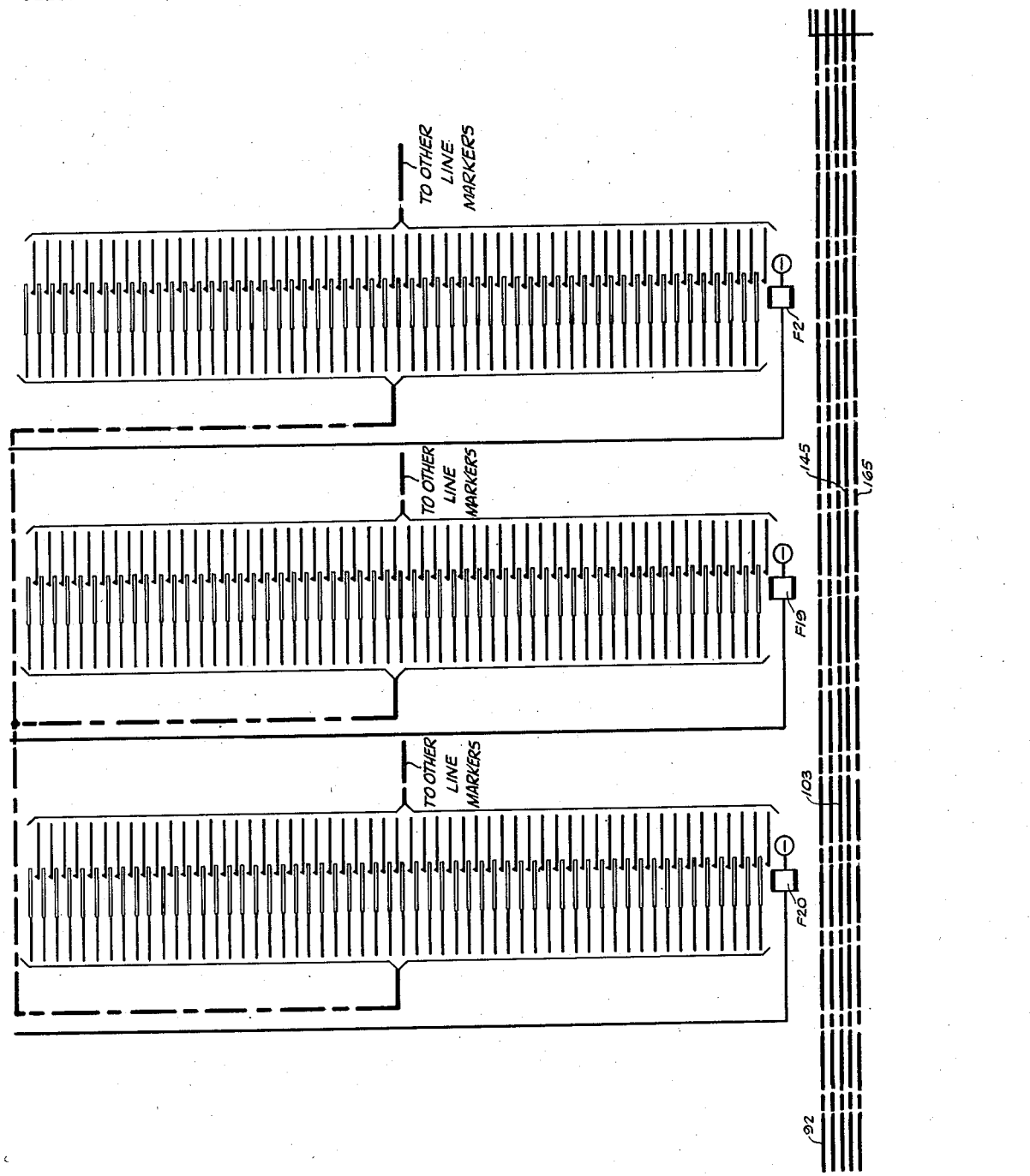
Figure 12:
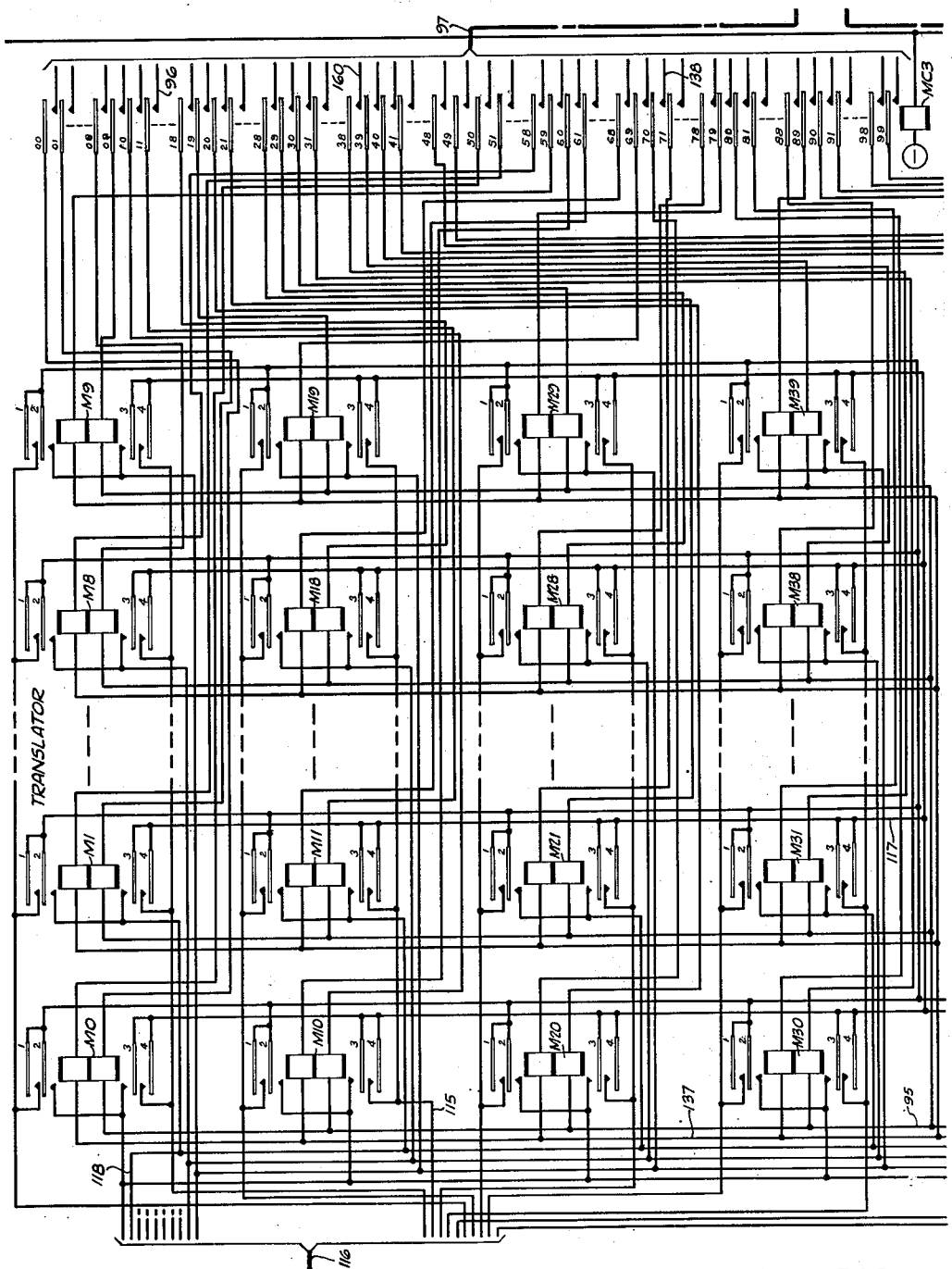
Figs. 12 to 14 show the circuits of the translator.
Figure 13:
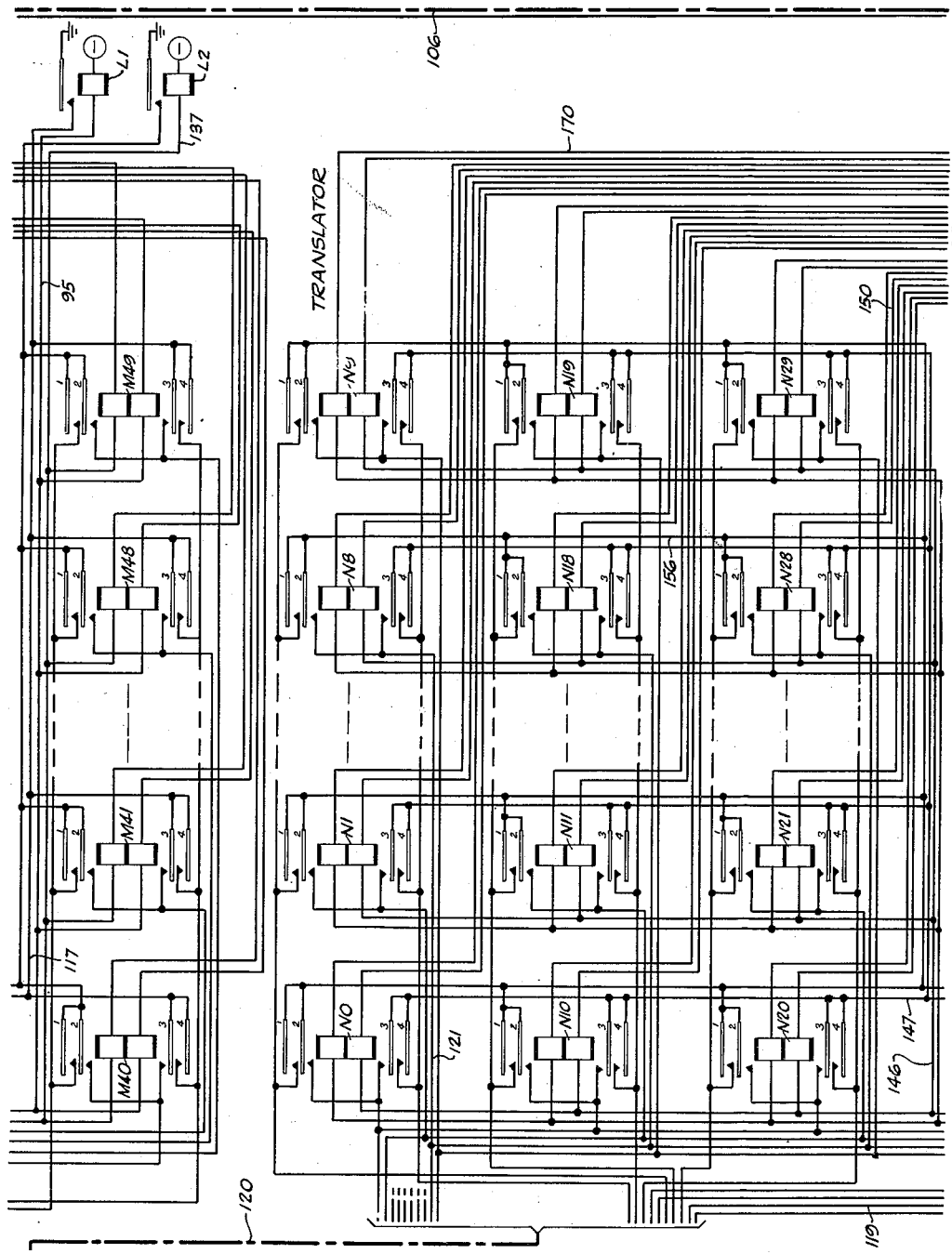
Figure 14:
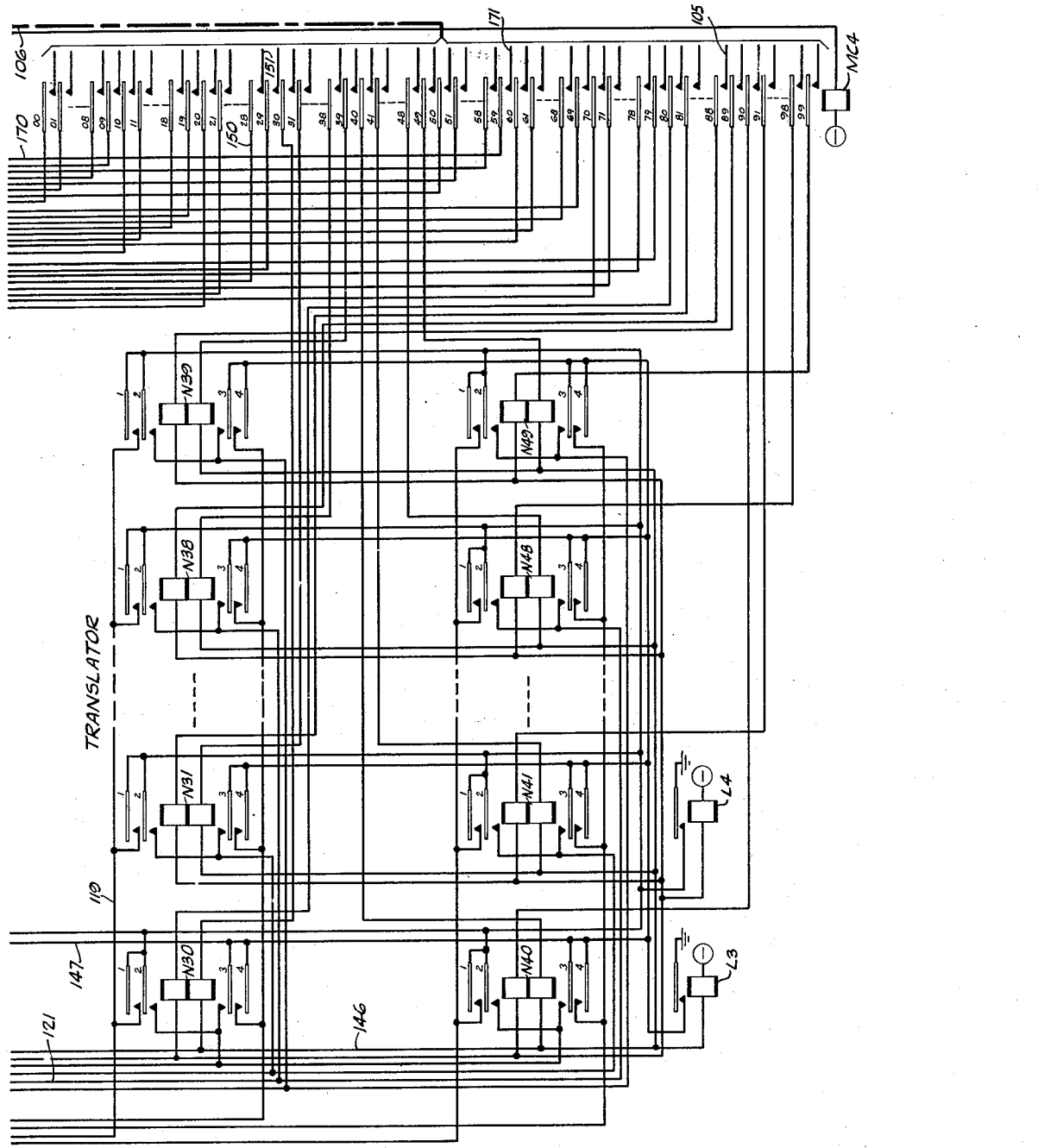
Figure 15:
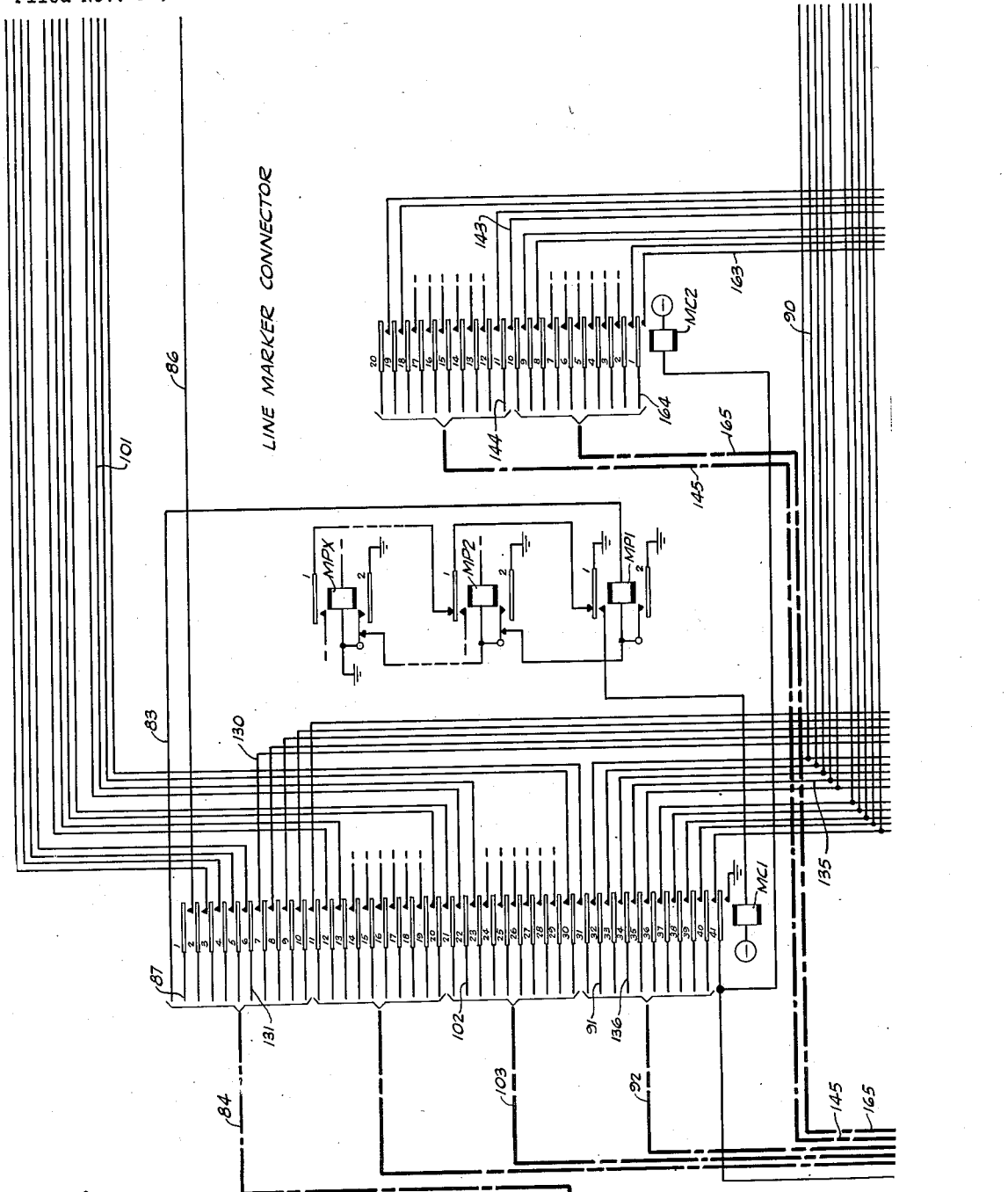
Figure 16:
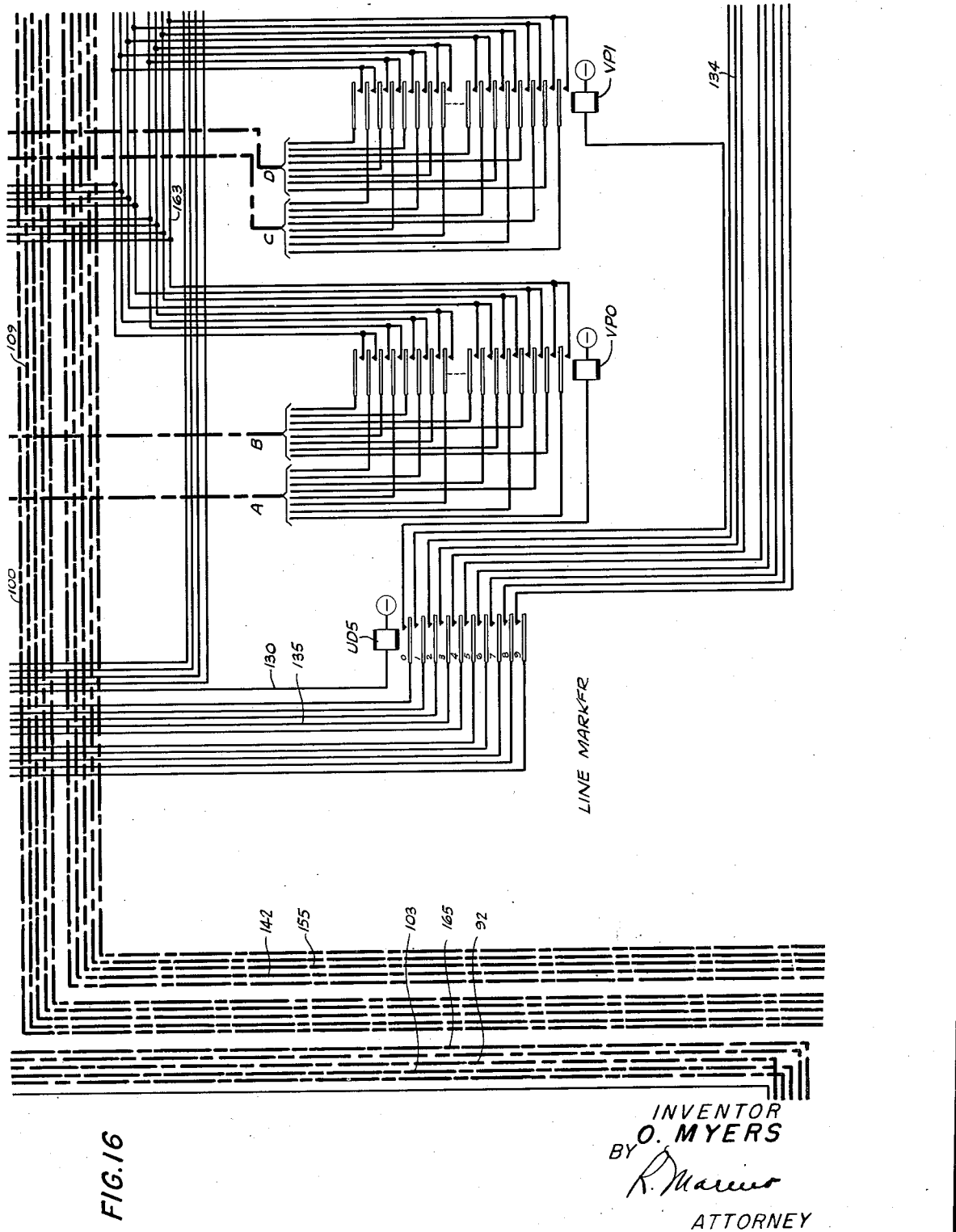
Figs. 16 and 18 to 24 show the circuits of a line marker.
Figure 17:
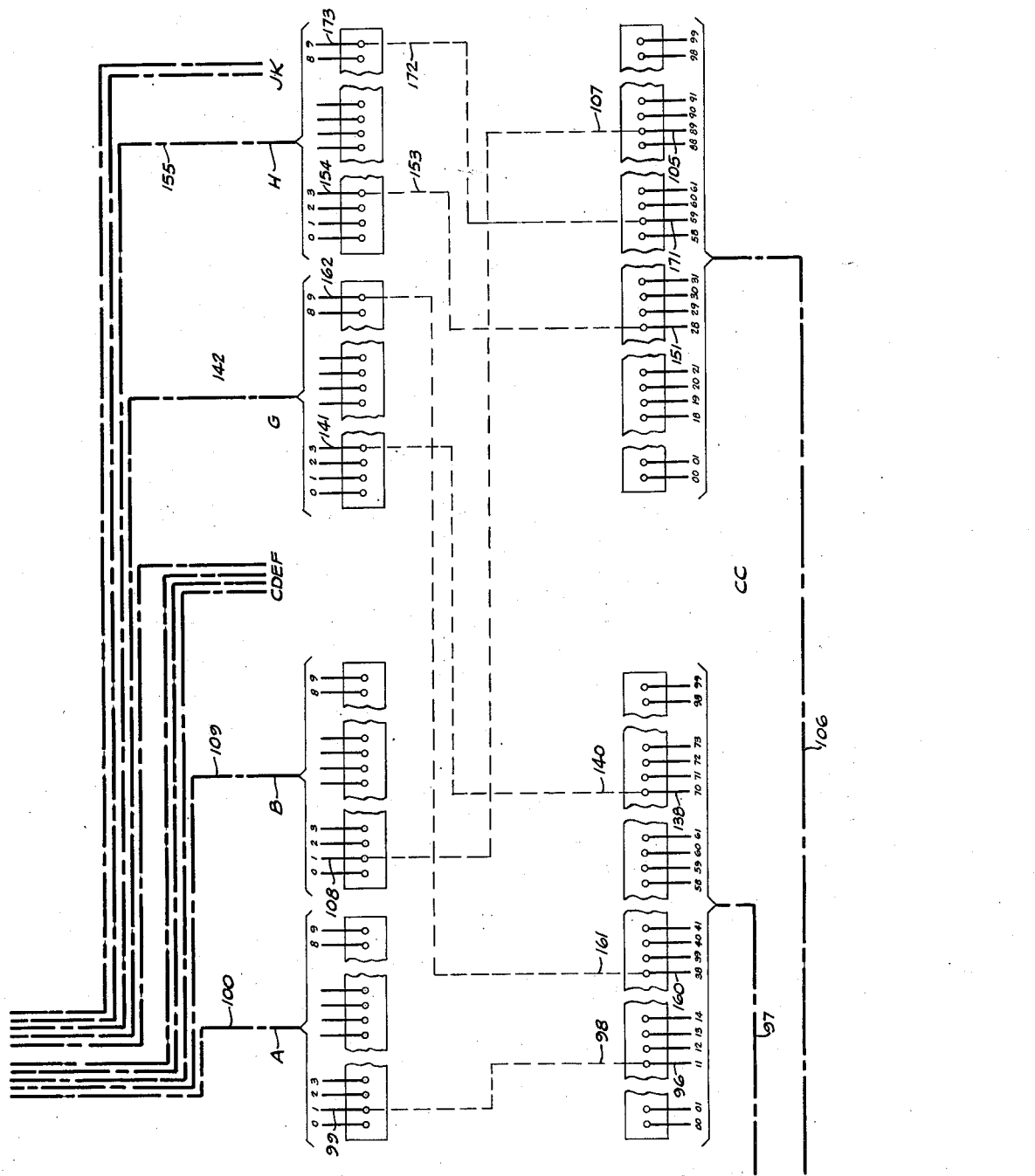
Fig. 17 shows the cross-connecting means.
Figure 18:
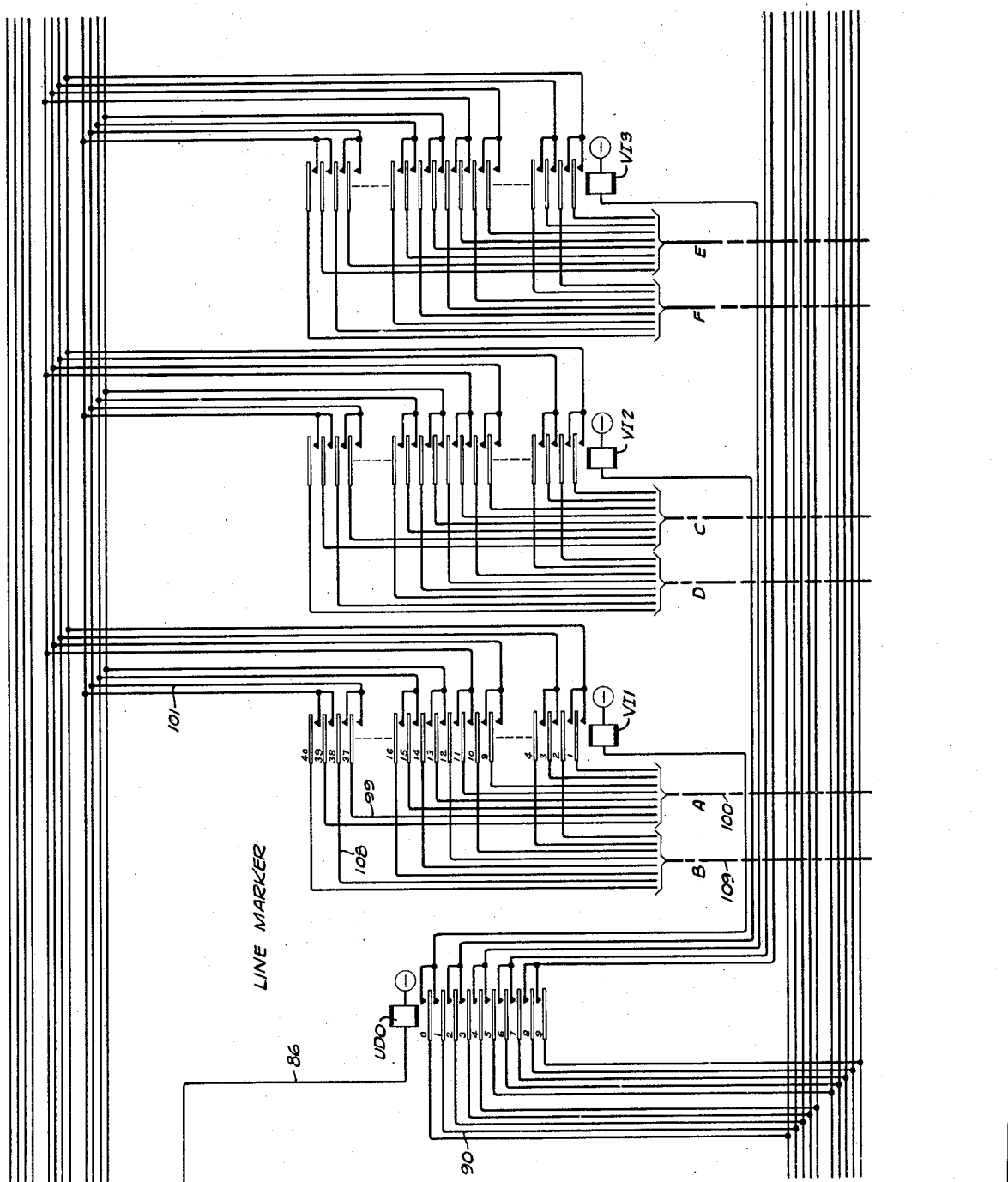
Figure 19:
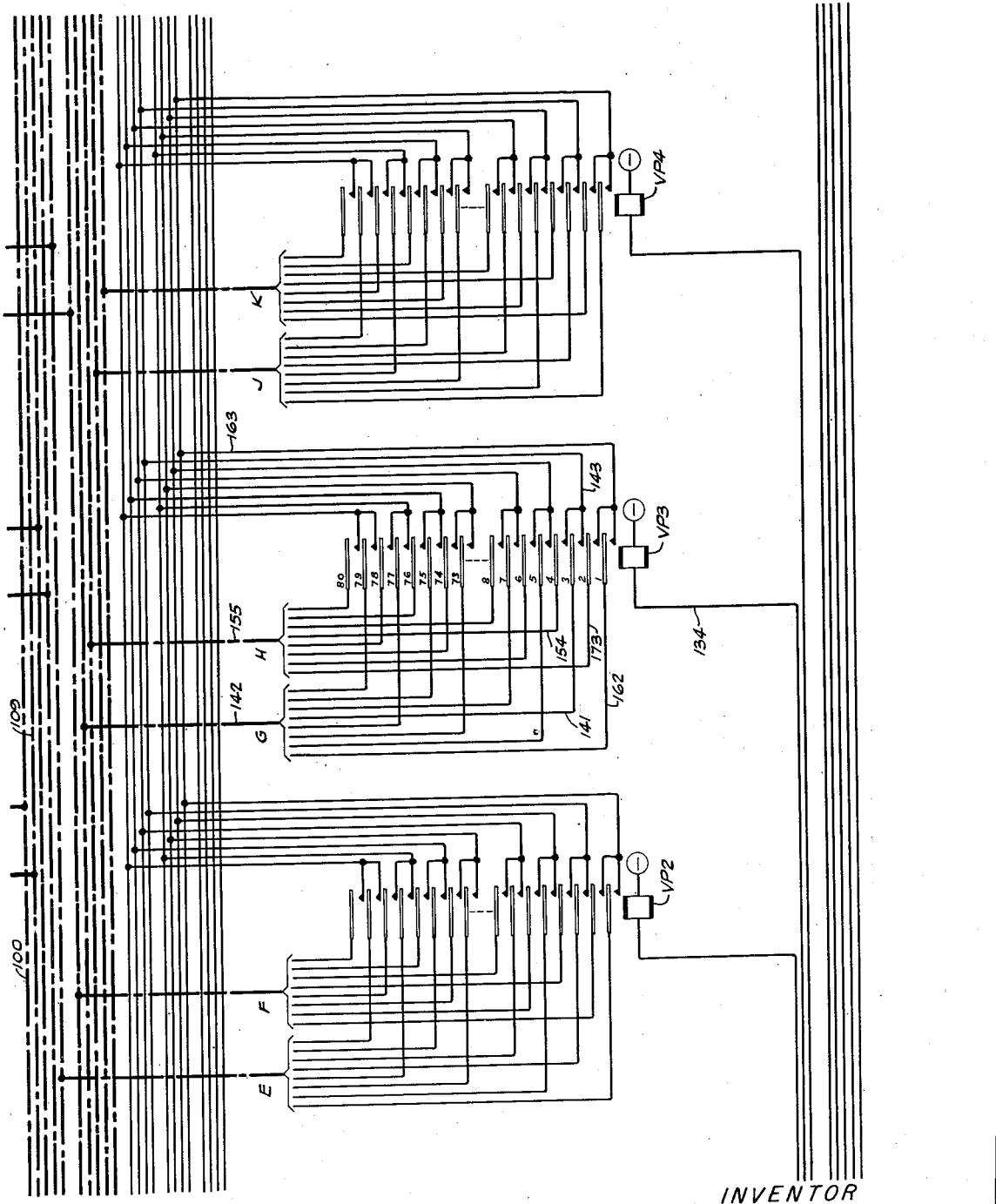
Figure 20:
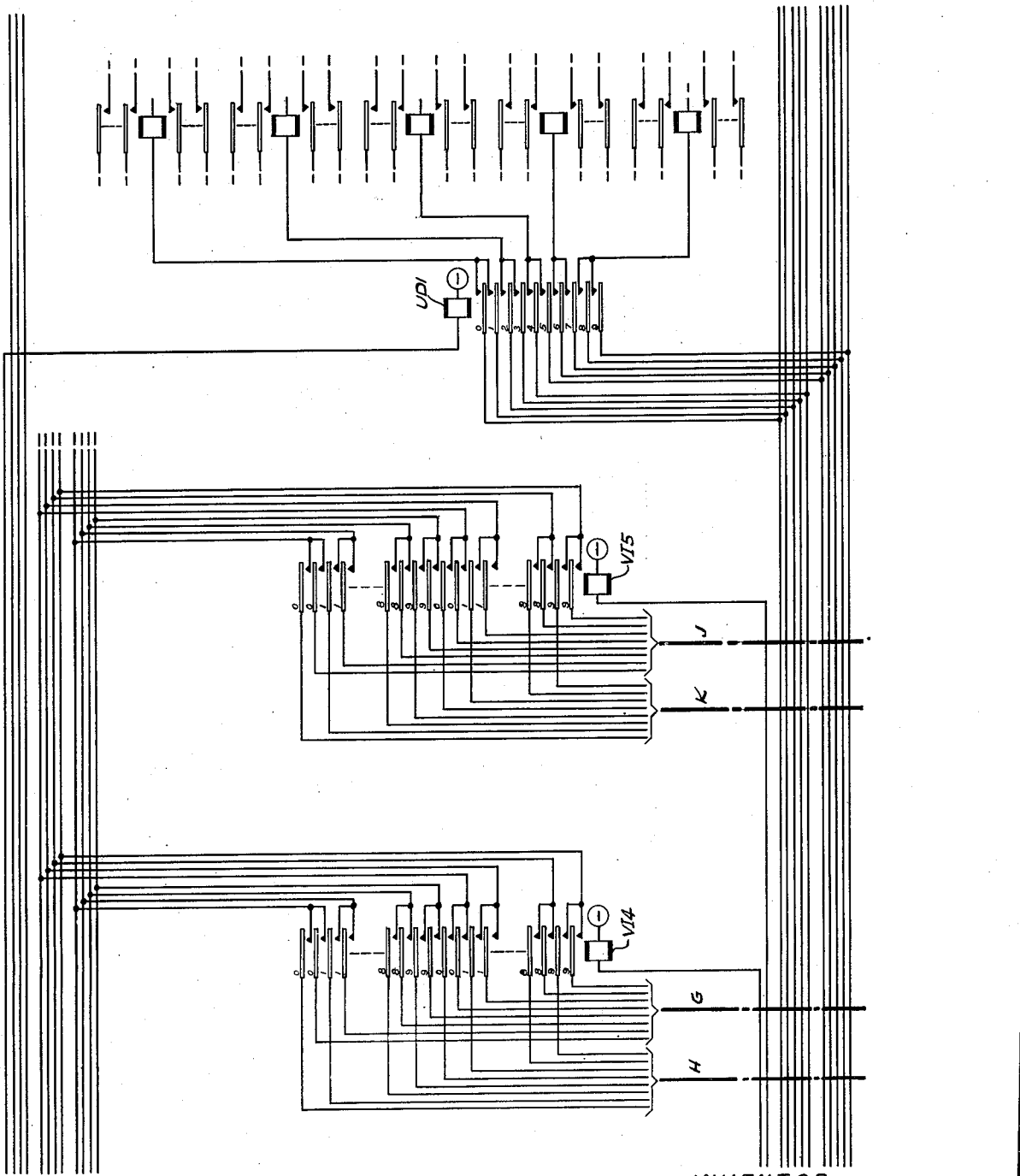
Figure 21:
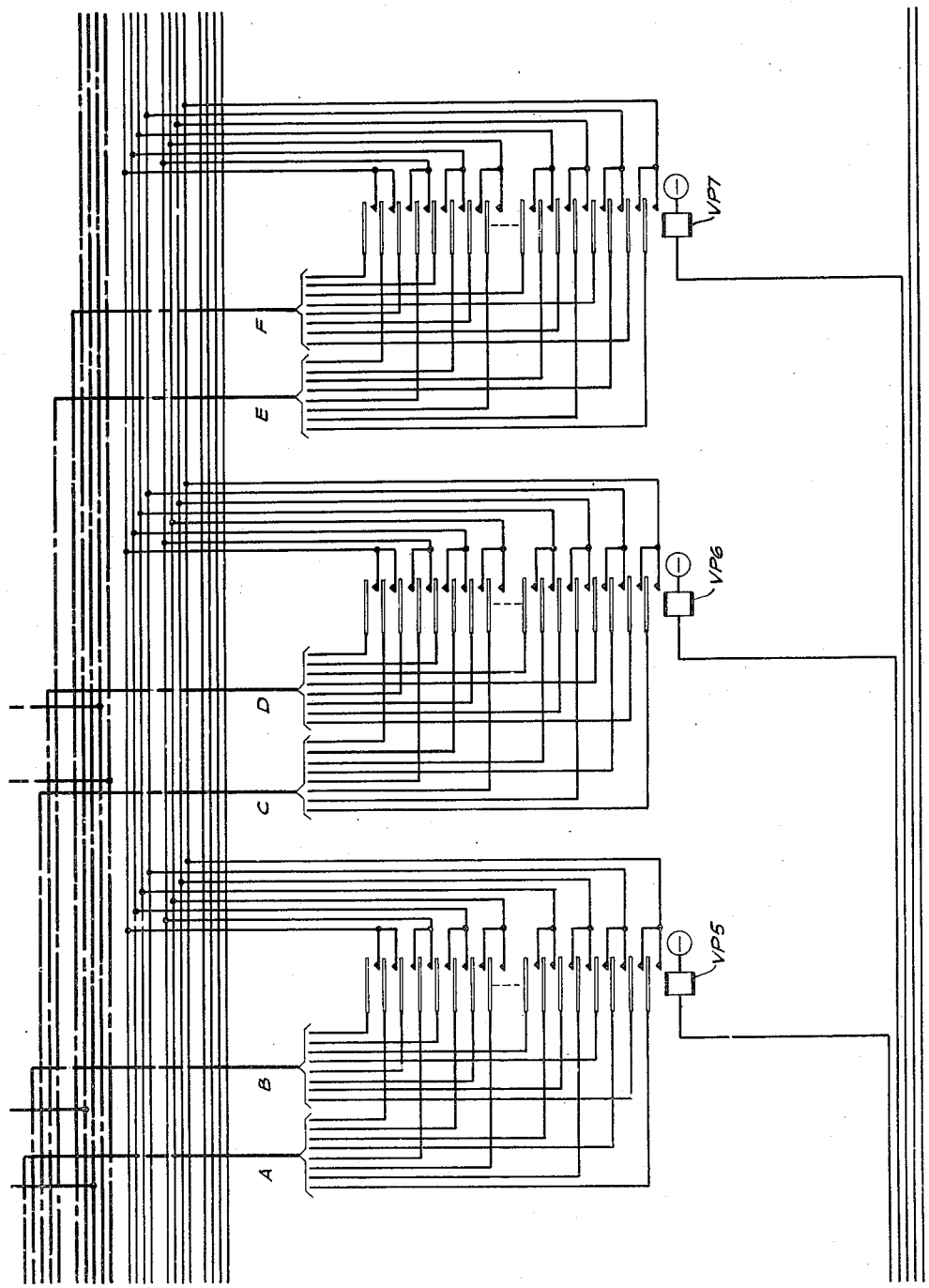
Figure 22:
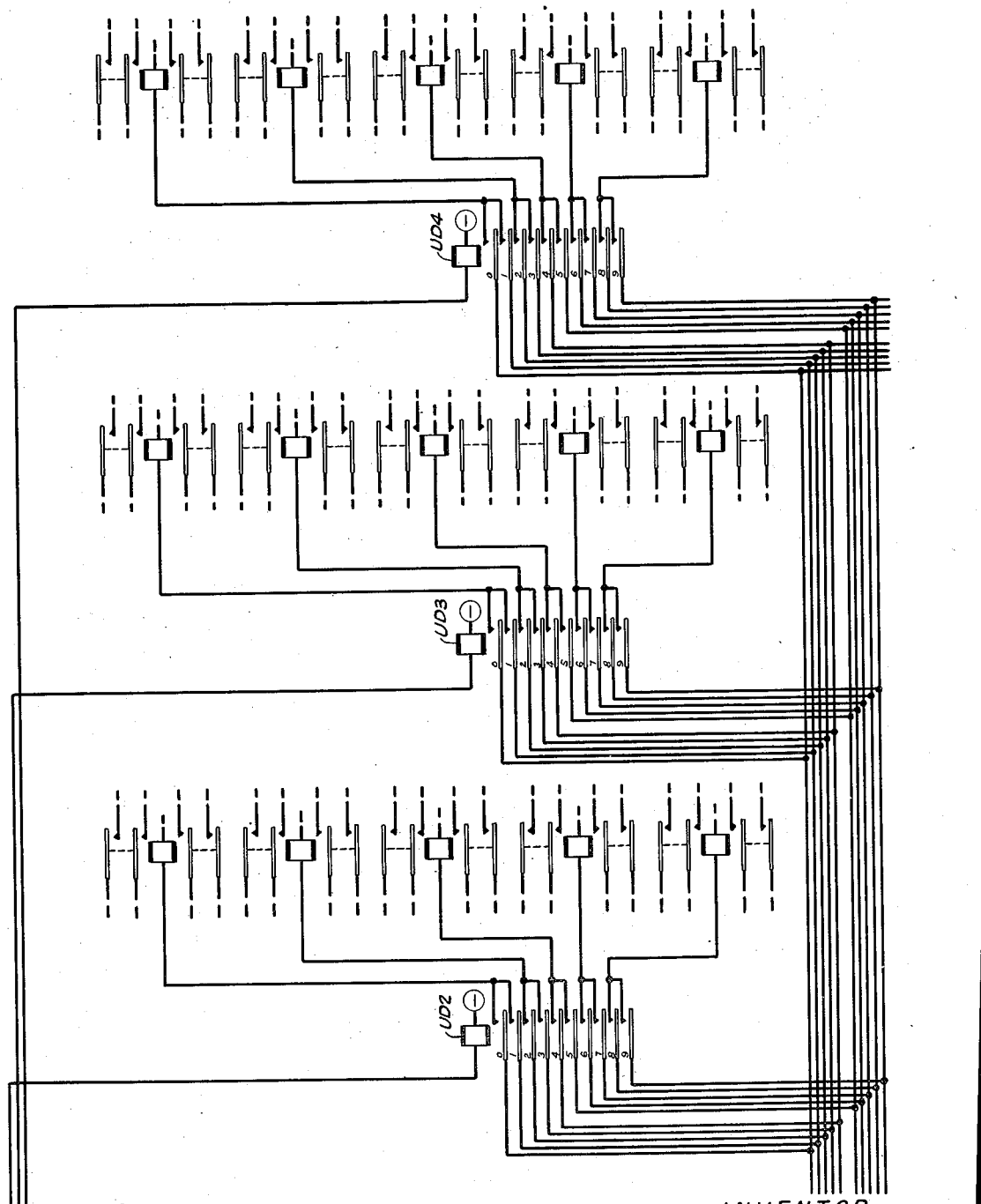
Figure 23:
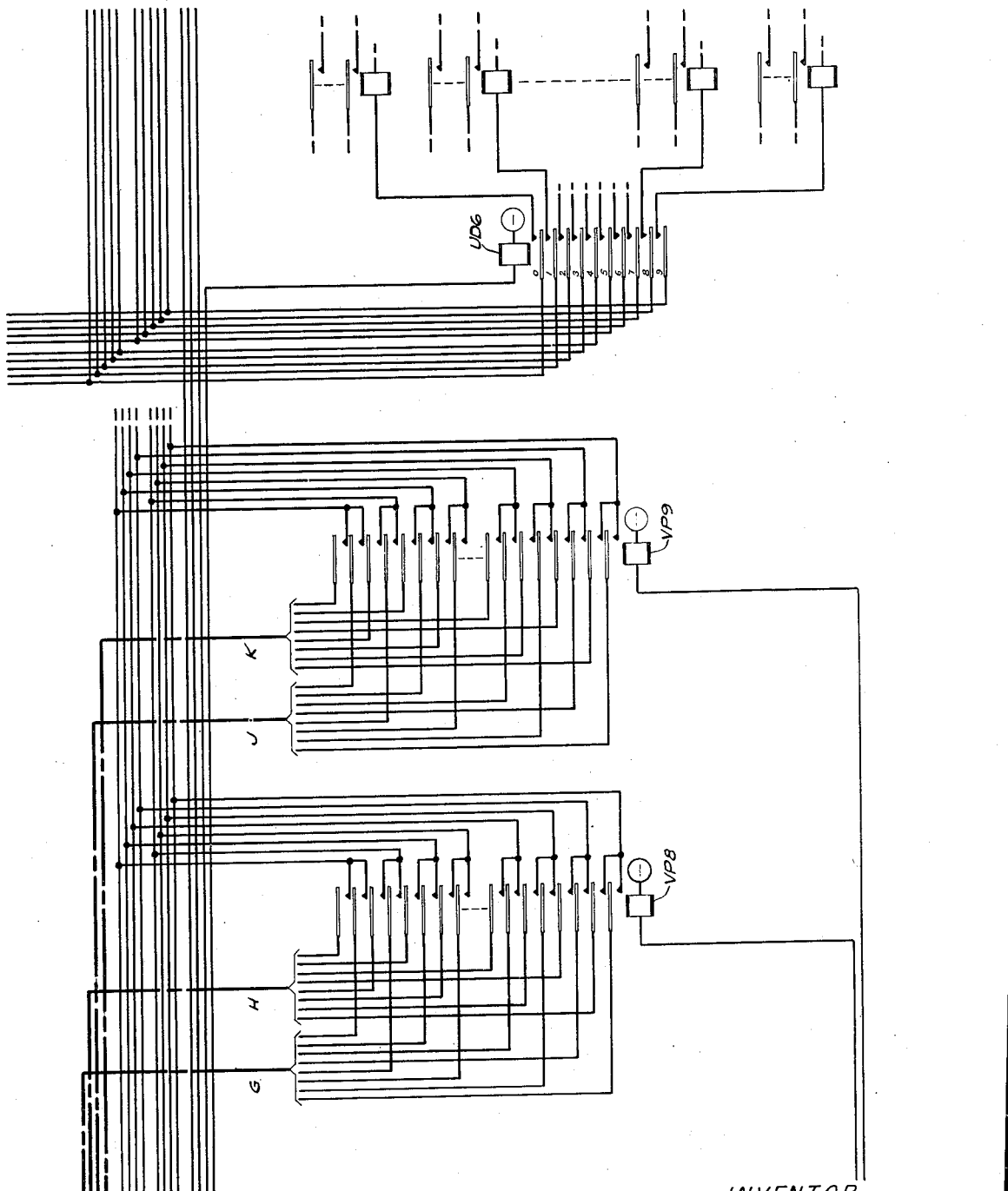
Figure 24:
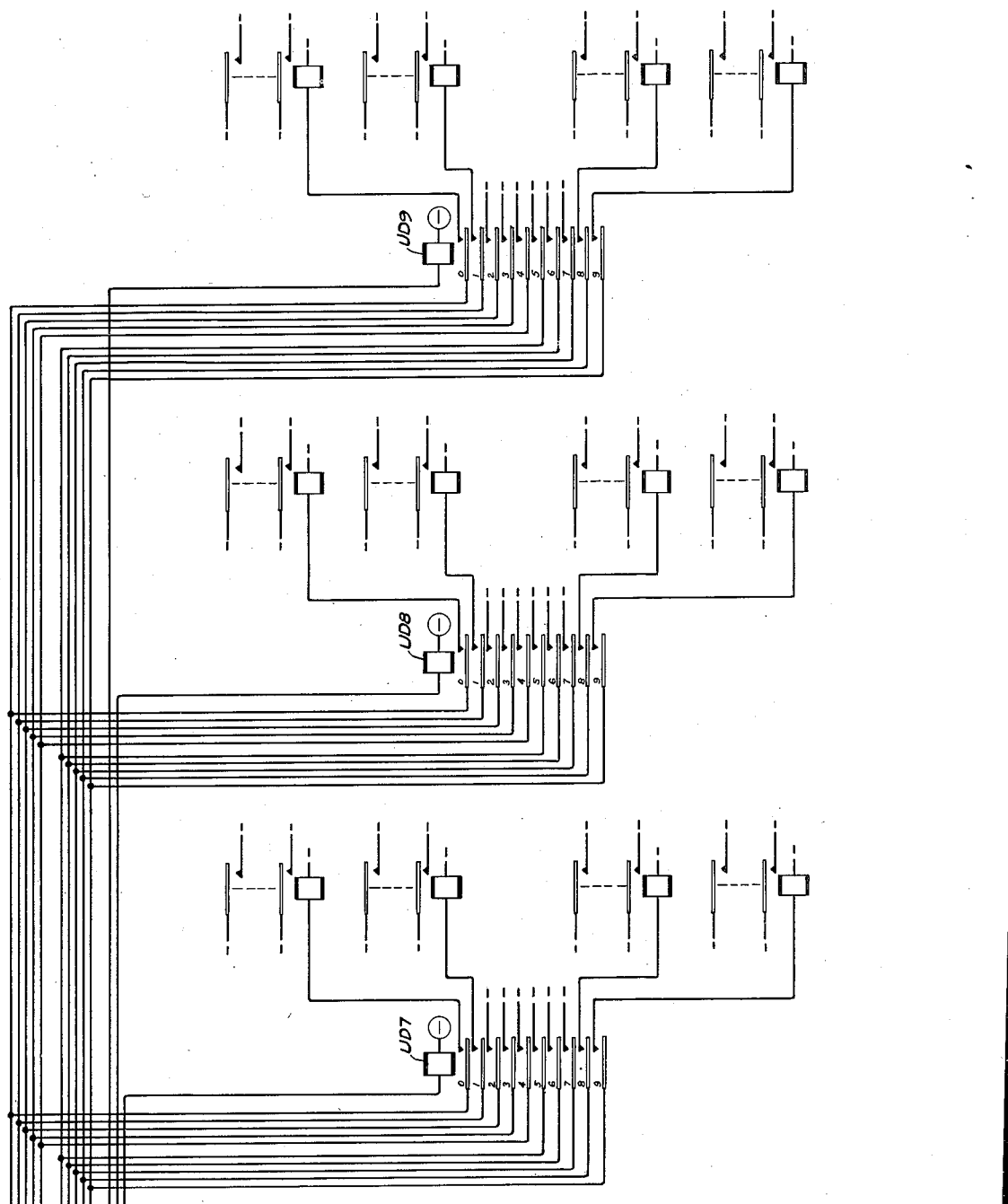

In telephone systems employing equipment of the cross bar type, each subscriber's line is connected to contacts of a line switch, ten switches being mounted in a vertical row. Ten consecutive vertical files of contacts, numbered "0" to "9," constitute a "column." The columns are numbered "000" to "999" and the columns of each hundred, which have a capacity of ten thousand subscribers' lines, are assigned to a central office unit. The numbering system, therefore, provides for ten central office units, each having a maximum capacity of ten thousand subscribers' lines, and each central office unit being indicated by the hundreds digit of the numbers of the columns in said unit. Any line may be identified by the number of the column, the number of the switch, and the number of the vertical file in said column to which said line is connected.

The copending application of W. W. Carpenter et al. Serial No. 759,402, filed July 7, 1947, discloses an automatic telephone recording system in which a calling line is identified in the manner described above and the calling station also identified as a ring-party or a tip-party station. This identification of the calling line and station is registered in the sender and said registration is used to control a recorder to record said identification, in conjunction with other information relating to the call made by said calling station.

The registration in the sender of the identification of the calling line is accomplished by the operation of two of a group of five relays for each digit registered, in accordance with the following code:

| Digit Registered | Relays Operated in Group of Five Relays |
|---|---|
| 0 | 1st and 2nd |
| 1 | 1st and 4th |
| 2 | 2nd and 4th |
| 3 | 4th and 5th |
| 4 | 2nd and 5th |
| 5 | 3rd and 4th |
| 6 | 1st and 3rd |
| 7 | 2nd and 3rd |
| 8 | 3rd and 5th |
| 9 | 1st and 5th |

Thus there are five groups of register relays in the sender to register the number of the column, the number of the switch, and the number of the vertical file. Column No. 123, switch No. 3, and vertical file No. 4, for example, are registered by the operation of the first and fourth relays of the first group for the hundreds digit "1" of the column number, the operation of the second and fourth relays of the second group for the tens digit "2" of the column number, the operation of the fourth and fifth relays of the third group for the units digit "3" of the column number, the operation of the fourth and fifth relays of the fourth group for the switch number "3," and the operation of the second and fifth relays of the fifth group for the vertical file number "4." The identification of the calling station is registered in the sender by the operation of one relay if the calling station is a ring-party station or by the operation of another relay if the calling station is a tip-party station.

A registration of this character identifies the calling station but it does not determine the directory number of said station which is the identification employed for billing the subscriber for the call. In the present invention, the registration of the identity of the calling station is translated to the directory number of said station and the registers reset in accordance with said directory number. The registers may then be used to control the recorder in the same manner as disclosed in the aforementioned Carpenter et al. application but the identification recorded is the directory number of the calling station and no further translation is necessary to determine the subscriber to whom the call should be charged.

Figures 25, 26:
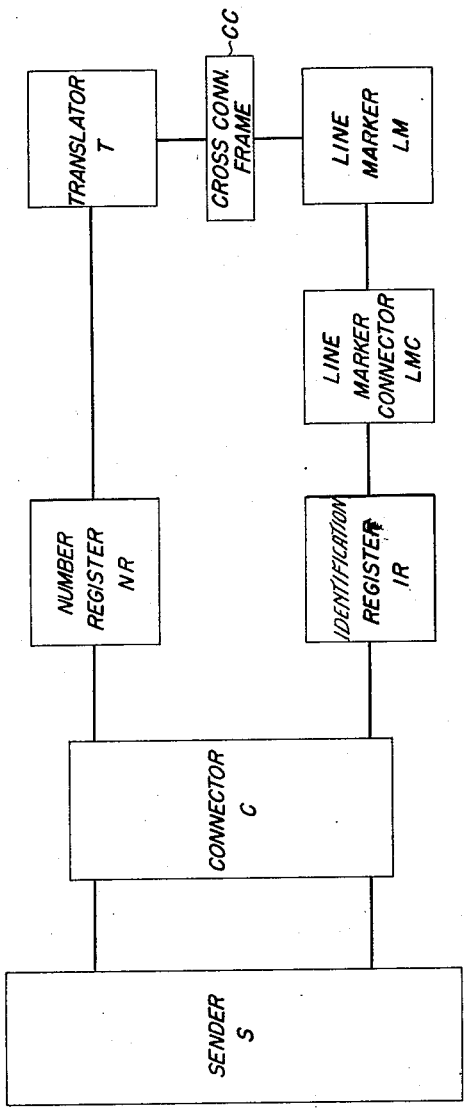
Fig. 25 is a block diagram of the principal circuits shown in detail in Figs. 1 to 24.
Fig. 26 shows how Figs. 1 to 24 should be placed in relation to one another to completely disclose the invention.

Fig. 25 shows, in the form of a block diagram, the principal circuits of the present embodiment of the invention, which are shown in more detail in Figs. 1 to 24. Referring to Fig. 25, S is the sender in which the identification of a calling station is registered, as described above. When translation of said identification is required, the connector C connects the identification register IR and the number register NR to the sender S. The identification of the calling line and station registered in the sender S is then transferred through connector C to the identification register IR. The line marker connector LMC connects the identification register IR to a line marker LM which marks the line indicated by said identification. The translator T then determines the directory number of the indicated calling station and registers said number in the number register NR. The connections between the line marker LM and the translator T are made through a cross-connecting frame CC to allow for flexibility in the assignment of lines to line switches. The operated register relays of the sender S are released and reset in accordance with the directory number registered in the number register NR and transmitted to the sender S through the connector C, which then disconnects the identification register IR and the number register NR from the sender S.

A saving in the equipment of the line markers may be made by confining two-party lines to certain columns and equipping the line markers to serve individual lines only in the other columns. For example, the line marker shown in Figs. 16 and 18 to 24 is arranged to serve ten columns with individual lines only in the first of said columns while two-party lines are served in the sixth column. Line markers may be arranged to serve two-party lines in any or all columns and in columns arranged to serve two-party lines, individual lines may also be served by the line marker.

For a clear understanding of the invention, the operation of the circuits in connection with a call from a station having the directory number "1188" and on an individual line connected to vertical file No. 1 of switch No. 1 in column No. 030 will now be described. Fig. 1 shows the relays of the sender on which the identification of the calling station is registered. In the present example, relays CHA and CHB are operated to register the hundreds digit "0" of the column number; relays CTD and CTE are operated to register the tens digit "3" of the column number; relays CUA and CUB are operated to register the units digit "0" of the column number; relays SWA and SWD are operated to register the switch number "1"; and relays VFA and VFD are operated to register the vertical file number "1." In the present example, the calling station is on an individual line and corresponds to a ring-party station. Relay RP is, therefore, operated to register this condition. Reference may be had to the above-mentioned Carpenter et al. application for a more complete description of the manner in which the identification of the calling line and station is registered.

When the relays of the sender are operated, as described above, they are locked up through their respective contacts and contacts of relay RL to ground. Conductors 50 to 60, inclusive, are thereby grounded through contacts of relay RL and contacts of the respective register relays.

When the sender is ready for the translation of the station identification to the directory number of the station, conductor 61 is momentarily grounded in said sender by any suitable means, operating relay ST which locks up through its No. 1 contacts and No. 3 contacts of relay R1 to ground. Relays CH, CT, CU, SW and VF operate over circuits extending from battery through the windings of said relays, conductors 62, No. 2 contacts of relay ST, and No. 3 contacts of relay R1 to ground, connecting conductors from the sender to the identification register. Relays CHA1, CHB1, CTD1, CTE1, CUA1, CUB1, SWA1, SWD1, VFA1, and VFD1 now operate. Relay CHA1, for example, operates over a circuit extending from battery through the winding of said relay, conductor 63 within bracket 64, and No. 1 contacts of relay CHA to ground on conductor 50. The other relays named operate over similar circuits. Relays CHA1 and CHB1 lock up through their No. 1 contacts, conductor 65, winding of relay A0, and No. 2 contacts of relay R2 to ground, operating relay A0. Relays CTD1 and CTE1 lock up through their No. 1 contacts, conductor 66, winding of relay A1, and No. 2 contacts of relay R2 to ground, operating relay A1. Relays CUA1 and CUB1 lock up through their No. 1 contacts, conductor 67, winding of relay A2, and No. 2 contacts of relay R2 to ground, operating relay A2. Relays SWA1 and SWD1 lock up through their No. 1 contacts, conductor 68, winding of relay A3, and No. 2 contacts of relay R2 to ground, operating relay A3. Relays VFA1 and VFD1 lock up through their No. 1 contacts, conductor 69, winding of relay A4, and No. 2 contacts of relay R2 to ground, operating relay A4.

Relay RP1 also operates over a circuit extending from battery through the winding of said relay, conductor 70 within bracket 71, and No. 7 contacts of relay VF to ground on conductor 60, and locks up through its No. 2 contacts, conductor 72, winding of relay A5, and No. 2 contacts of relay R2 to ground, operating relay A5. A circuit is thereby completed from battery through the contacts of relays A5, A4, A3, A2, A1, and A0 in series, No. 4 contacts of relay R1, and winding of relay SR to ground, over which relay SR operates. By the operation of relays CHA1, CHB1, CTD1, CTE1, CUA1, CUB1, SWA1, SED1, VFA1, VFD1, and RP1, the identification of the calling line and station, as registered in the sender, is registered in the identification register. If through some fault, relays in each of the groups CHA1 . . . CHE1, CTA1 . . . CTE1, CUA1 . . . CUE1, SWA1 . . . SWE1, and VFA1 . . . VFE1 and one of the relays TP1 and RP1 are not operated, all of the relays A0 . . . A5 will not be operated. The circuit of relay SR will then not be closed and said relay will not operate. Additional contacts of relays CHAI ... CHEI, CTAI ... CTEI, CUAI ... CUEI, SWAI ... SWEI, and VFAI ... VFEI may be provided and connected in a well-known manner so that if more or less than two relays in each of said groups are operated, all of relays A0 ... A5 will not be operated, thus preventing the operation of relay SR and the consequent elimination of the registration in the sender, as described below, if an incorrect registration of the calling-line identification is made by the above-mentioned relays.

Assuming, however, that relay SR operates, relay RL operates over a circuit extending from battery through the winding of said relay, conductor 73, No. 1 contacts of relay RI, and No. 2 front contacts of relay SR to ground, opening the locking circuits of and releasing the operated register relays of the sender. Relays CO1 ... CO5 of the connector operate over a circuit extending from battery through the windings of said relays, conductor 91, and No. 1 contacts of relay SR to ground.

By the operation of two of relays VFAI ... VFEI, as described above, registering the vertical file number, one of relays VF0 ... VF9 is operated in accordance with said vertical file number. In the present example, relays VFAI and VFDI being operated to register the vertical file number "1," relay VFI operates over a circuit extending from battery through the winding of said relay, No. 4 contacts of relay VFDI, and No. 2 contacts of relay VFAI to ground. Relay VO then operates if said vertical file number is odd or relay VE operates if said number is even. In the present case, relay VO operates over an obvious circuit to ground through No. 1 contacts of relay VFI.

Likewise, by the operation of two of the relays SWAI ... SWEI to register the switch number, as described above, one of the relays SW0 ... SW9 is operated in accordance with said switch number. In the present example, relays SWAI and SWDI being operated to register the switch number "1," relay SW1 operates over a circuit extending from battery through the winding of said relay, conductor 75, No. 4 contacts of relay SWDI and No. 2 contacts of relay SWAI to ground.

In accordance with the column number registered by the operation of combinations of relays CHAI ... CHEI, CTAI ... CTEI, and CUAI ... CUEI, the appropriate line marker is now selected and connected to the identification register, as will now be described. Relay B50 operates if the tens digit of said column number is below "5." Relay A50 operates if said tens digit is above "5." One of the relays T05, T16, T27, T38 and T49 also operates in accordance with the registered tens digit, relay T05 operating if said digit is "0" or "5," relay T16 operating if said digit is "1" or "6," etc. One of the relays F1 ... F20 (relays F1, F2, F19, and F20 only being shown) operates in accordance with the registered hundreds and tens digits of the column number, relay F1 operating if the hundreds digit is "0" and the tens digit "0," "1," "2," "3" or "4," relay F2 operating if the hundreds digit is "0" and the tens digit "5," "6," "7," "8," or "9," relay F3 operating if the hundreds digit is "1" and the tens digit "0," "1," "2," "3," or "4," etc. Operation of the three relays selects the line marker serving the column numbers among which is the registered column number.

In the present example, relays CTDI and CTEI being operated, registering the tens digit "3," relay B50 operates over a circuit extending from battery through the winding of said relay, conductor 76, No. 8 contacts of relay CTEI, and No. 8 contacts of relay CTDI to ground. Relay T38 operates over a circuit extending from battery through the winding of said relay, conductor 77, No. 4 contacts of relay CTEI, and No. 8 contacts of relay CTDI to ground. Relay F1 operates over a circuit extending from battery through the winding of said relay, conductor 78, No. 1 contacts of relay B50, conductor 79 within bracket 80, No. 3 contacts of relay CHBI, and No. 2 contacts of relay CHAI to ground. The preference relay MPI then operates over a circuit extending from battery through No. 1 contacts of relay T38, conductor 81 within bracket 82, No. 22 contacts of relay F1, conductor 83 within bracket 84, winding of relay MPI, and No. 2 normal contacts of relays MP2 ... MPX in series to ground, if none of the relays MP2 ... MPX are operated. If any of the relays MP2 ... MPX are operated, operation of relay MPI awaits release of said operated relays. When relay MPI operates, it locks up through its No. 2 front contacts to ground, and operates relay MC1 over an obvious circuit. Relay MC1 connects the identification register to the line marker shown in Figs. 16 and 18 ... 24. This line marker serves column numbers "030" ... "039" and, therefore, is the appropriate marker for the column number "030" registered in the identification register. Relays MC2, MC3, and MC4 also operate over obvious circuits through No. 41 contacts of relay MC1 to ground, relay MC2 connecting additional conductors between the identification register and the line marker and relays MC3 and MC4 connecting the windings of the translator relays to the cross-connecting frame CC.

One of the relays UD0 ... UD9 in the line marker now operates in accordance with the registered units digit of the column number. In the present example, relays CUAI and CUBI being operated, registering the digit "0," relay UD0 operates over a circuit extending from battery through the winding of said relay, conductor 86, No. 1 contacts of relay MC1, conductor 87 within bracket 84, No. 21 contacts of relay F1, conductor 88 within bracket 82, No. 2 contacts of relay T38, conductor 89, No. 3 contacts of relay CUBI, and No. 2 contacts of relay CUAI to ground. One of the relays VI1 ... VI5 operates in accordance with the registered vertical file number. In the present example, relays VFAI and VFDI being operated and, in consequence, relay VFI being operated, registering the vertical file number "1," relay VI1 operates over a circuit extending from battery through the winding of said relay, No. 1 contacts of relay UD0, conductor 90, No. 32 contacts of relay MC1, conductor 91 within bracket 92, and No. 2 contacts of relay VFI to ground. Relays UD0 and VI1 mark the position of the identified line as the sixth column of the ten columns served by the line marker and the first or second vertical file in that column.

By the operation of relay VI1 circuits are completed between relays SW0 ... SW9 of the identification register and the relays of the translator through cross-connections on the cross-connecting frame CC. The cross-connections on said frame are made in accordance with the directory number of each subscriber's station and the line-switch vertical file to which it is connected. As a result, circuits are completed for one of the relays M0 ... M49 in accordance with the first two digits of the directory number of the identified station and for one of relays N0 ... N49 in accordance with the last two digits of said number. In the present case, a circuit is completed from battery through the winding of relay L1, conductor 95, lower winding of relay M11, No. 11 contacts of relay MC3, conductor 96 within bracket 97, cross-connection 98, conductor 99 within bracket 100, No. 37 contacts of relay V11, conductor 101, No. 22 contacts of relay MC1, conductor 102 within bracket 103, and No. 1 contacts of relay VO to the previously-traced ground on conductor 75, over which relay M11 operates. Relay L1 also operates over the above-traced circuit. Relay N38 operates over a circuit extending from battery through the winding of relay L4, upper winding of relay N38, No. 88 contacts of relay MC4, conductor 105 within bracket 106, cross-connection 107, conductor 108 within bracket 109, and No. 38 contacts of relay V11 to the above-traced ground on conductor 101. Relay L4 also operates over the above circuit.

The directory number indicated by the operation of relays M11 and N38 is next registered by the number register. Relay TH1 operates over a circuit extending from battery through the winding of said relay, conductor 115 within bracket 116, No. 4 contacts of relay M11, conductor 117, and contacts of relay L1 to ground. Relay H1 operates over a circuit extending from battery through the winding of said relay, conductor 118 within bracket 116, No. 3 contacts of relay M11, conductor 117, and contacts of relay L1 to ground. Relay T8 operates over a circuit extending from battery through the winding of said relay, conductor 119 within bracket 120, No. 1 contacts of relay N38, and contacts of relay L4 to ground. Relay U8 operates over a circuit extending from battery through the winding of said relay, conductor 121 within bracket 120, No. 2 contacts of relay N38, and contacts of relay L4 to ground. One of the relays O1 ... O19 also operates in accordance with the hundreds digit of the registered column number and therefore, in accordance with the central-office unit indicated by said digit. In the present example, relay O1 operates over a circuit extending from battery through the winding of said relay, conductor 122 within bracket 123, and No. 56 contacts of relay F1 to ground.

Upon the operation of relays TH1, H1, T8, U8 and O1, as described above, a circuit is completed from battery through the winding of relay R1, No. 3 contacts of relay O1, conductor 124, No. 1 contacts of relay TH1, No. 1 contacts of relay H1, conductor 125, No. 1 contacts of relay T8, and No. 1 contacts of relay U8 to ground, over which relay R1 operates. The circuit of relay RL is opened by No. 1 contacts of relay R1 and relay RL released. The circuit of relays VF, SW, CU, CT and CH is opened by No. 3 contacts of relay R1 and said relays released. The locking circuit of relay ST is also opened and said relay released. The circuit of relay SR is opened by No. 4 contacts of relay R1, but relay SR is slow to release and before it releases, the register relays of the sender reoperate. Relay CHA operates over a circuit extending from battery through the winding of said relay, conductor 50 within bracket 49, No. 1 contacts of relay CO1, conductor 126 within bracket 127, and No. 1 contacts of relay O1 to ground and locks up through its contacts and contacts of relay RL to ground. Relay CHB operates over a circuit extending from battery through the winding of said relay, conductor 51 within bracket 49, No. 2 contacts of relay CO1, conductor 128 within bracket 127, and No. 2 contacts of relay O1 to ground and locks up through its contacts and contacts of relay RL to ground. These two relays, CHA and CHB, register with the digit "0" as the designation of the central-office unit in which the calling line is located, as indicated by the first digit of the column number. In a similar manner, relays CTA and CTD operate through contacts of relay TH1 and lock up to register the digit "1" as the first digit of the directory number, while relays CUA, CUD, SWC, SWE, VFC, and VFE similarly operate and lock up, registering the remaining digits "188" of the directory number.

When relay SR releases, its No. 1 contacts open the circuits of and release relays CO1 ... CO5. Relay R2 operates over a circuit extending from battery through its winding, No. 2 contacts of relay R1, and No. 2 back-contacts of relay SR to ground. The No. 1 contacts of relay R2 ground conductor 129 as an indication to the sender that identification of the directory number of the calling station is completed. The No. 2 contacts of relay R2 open the locking circuits of relays A0 ... A5, CHA1, CHB1, CTD1, STE1, CUA1, CUB1, VFA1, VFD1, SWA1, and SWD1, releasing said relays which, in turn, release the other operated relays of the system. When relays O1, TH1, H1, T8 and U8 release, the circuit of relay R1 is thereby opened and said relay released, opening the circuit of and releasing relay R2.

If the calling station is a station of a two-party line, the operation of the circuits is similar to that described above but, for a clear understanding of the invention, the operations in connection with a call from a tip-party station having the directory number "7028" and connected to vertical file No. 3 of switch No. 9 in column No. 035 will now be described.

The identification of said calling station having been registered in the sender, the operation of the relays of the identification register and of the line-marker connector is similar to that described above for a call from a station of an individual line, relays CHA1, CHB1, CTD1, CTE1, CUC1, CUD1, SWA1, SWE1, VFD1, VFE1, VF3, VO, SW9, and TP1 operating to register the identification of the calling station, relays B50, T38, F1, MC1, and MC2 operating to connect the identification register to the line marker, and relays MC3 and MC4 operating to connect the line marker to the translator, in the manner previously described. Relay UD5 then operates over a circuit extending from battery through the winding of said relay, conductor 130, No. 6 contacts of relay MC1, conductor 131 within bracket 84, No. 16 contacts of relay F1, conductor 132 within bracket 82, No. 7 contacts of relay T38, conductor 133, No. 3 contacts of relay CUD1, and No. 2 contacts of relay CUC1 to ground. Relay VP3 operates over a circuit extending from battery through the winding of said relay, conductor 134, No. 3 contacts of relay UD5, conductor 135, No. 34 contacts of relay MC1, conductor 136 within bracket 92, and No. 1 contacts of relay VF3 to ground. Relay M20 operates over a circuit extending from battery through the winding of relay L2, conductor 137, upper winding of relay M20, No. 70 contacts of relay MC3, conductor 138 within bracket 97, cross-connection 140, conductor 141 within bracket 142, No. 3 contacts of relay VP3, conductor 143, No. 11 contacts of relay MC2, conductor 144 within bracket 145, No. 1 contacts of relay SW9, and No. 1 contacts of relay TP1 to ground. Relay L2 also operates over the circuit traced above. Relay N28 operates over a circuit extending from battery through the winding of relay L3, conductor 146, lower winding of relay N28, conductor 150, No. 28 contacts of relay MC4, conductor 151 within bracket 106, cross-connection 153, conductor 154 within bracket 155, No. 4 contacts of relay VP3, conductor 143, No. 11 contacts of relay MC2, conductor 144 within bracket 145, No. 1 contacts of relay SW9, and No. 1 contacts of relay TP1 to ground. Relay L3 also operates over the above-traced circuit. Relays TH7, H0, T2, and U8 now operate over circuits similar to those previously traced for relays TH1, H1, T8, and U8. For example, relay U8 operates over a circuit extending from battery through the winding of said relay, conductor 121 within bracket 120, No. 3 contacts of relay N28, conductor 147, and contacts of relay L3 to ground. Relay O1 also operates over the circuit previously traced. The central-office unit number and the directory number of the calling station are thus registered in the number register. The register relays of the sender are then operated in accordance with said directory number in the manner previously described.

On a call from the ring-party station of the same line, the same relays in the identification register, the line-marker connector, and the line marker are operated except that relay RP1 is operated instead of relay TP1. Assuming that the directory number of said ring-party station is "3859" and that suitable cross-connections are made for said number, relay M38 then operates over a circuit extending from battery through the winding of relay L1, conductor 95, lower winding of relay M38, No. 38 contacts of relay MC3, conductor 160 within bracket 97, cross-connection 161, conductor 162 within bracket 142, No. 1 contacts of relay VP3, conductor 163, No. 1 contacts of relay MC2, conductor 164 within bracket 165, No. 2 contacts of relay SW9 and No. 1 contacts of relay RP1 to ground. Relay N9 operates over a circuit extending from battery through the winding of relay L4, conductor 146, upper winding of relay N9, conductor 170, No. 59 contacts of relay MC4, conductor 171 within bracket 106, cross-connection 172, conductor 173 within bracket 155, No. 2 contacts of relay VP3, conductor 163, No. 1 contacts of relay MC2, conductor 164 within bracket 165, No. 2 contacts of relay SW9 and No. 1 contacts of relay RP1 to ground.

Operation of relays M38 and N9 cause the operation of relays CTD, CTE, CUC, CUE, SWC, SWD, VFA, and VFE in the sender in the manner previously described, registering the directory number of the calling station as "3859."

The terms and expressions which I have used in reference to my invention are used as terms of description and not of limitation and I have no intention in the use of such terms and expressions of excluding equivalents or modifications of the features shown or described or parts thereof but, on the contrary, intend to include therein any and all equivalents and modifications which may be employed without departing from the spirit of the invention.

What is claimed is:

1. In a telephone system including a line terminating on the terminals of a frame and having a first designation indicative of said terminal location and a second designation indicative of the identity of said line, the combination of a register settable in accordance with said first designation, means responsive to said register for translating the setting thereof to said second designation, and means responsive to said translating means for resetting said register in accordance with said second designation.

2. In a telephone system including a line terminating on the terminals of a frame and having two stations thereon, said line having a designation indicative of said terminal location and each of said stations having a first designation indicative of its character and a second designation indicative of its identity, the combination of a register settable in accordance with said terminal location designation and the first designation of either one of said stations, means responsive to said register for translating the setting of said register to the second designation of said station, and means responsive to said translating means for resetting said register in accordance with said latter designation.

3. In a telephone system including lines terminating on terminals of frames in a plurality of central office units, each of said units having a distinguishing designation and each of said lines having a first designation indicative of its terminal location and a second designation indicative of its identity, the combination of a register settable in accordance with the terminal location designation of one of said lines, means responsive to said register for translating the setting of said register to the second designation of said line and the designation of the unit in which said line is located, and means responsive to said translating means for resetting said register in accordance with said translation.

4. In a telephone system including lines terminating on terminals of frames in a plurality of central office units, each of said units having a distinguishing designation and each of said lines having a designation indicative of its terminal location, some of said lines having two stations thereon each of which has a first designation indicative of its character and a second designation indicative of its identity, the combination of a register settable in accordance with the terminal location designation of a line having two stations thereon and in accordance with the first designation of either one of said stations, means responsive to said register for translating the setting of said register to the second designation of said station and the designation of the unit in which said line is located, and means responsive to said translating means for resetting said register in accordance with said translation.

5. In a telephone system including lines terminating on terminals of frames in a plurality of central office units, each of said units having a distinguishing designation and each of said lines having a designation indicative of its terminal location, some of said lines having two stations thereon each of which has a first designation indicative of its character and a second designation indicative of its identity, the combination of a first register settable in accordance with the terminal location designation of a line having two stations thereon and in accordance with the first designation of either one of said stations, a second register responsive to said first register, a plurality of line markers, selecting means responsive to said second register for selecting one of said line markers, a translator responsive to said selected line marker, a third register responsive to said translator, and means responsive to said third register for resetting said first register in accordance with the second designation of said station and the designation of the unit in which said line is located.

OSCAR MYERS.

REFERENCES CITED

The following references are of record in the file of this patent:

UNITED STATES PATENTS

| Number | Name | Date |
|---|---|---|
| 2,286,445 | Taylor | June 16, 1942 |
| 2,385,228 | Ostline | Sept. 18, 1945 |
| 2,422,565 | Powell | June 17, 1947 |
| 2,440,277 | Kruithof | Apr. 27, 1948 |
| 2,484,612 | Dehn | Oct. 11, 1949 |